United States Patent [19]
Ogino

[11] Patent Number: 5,815,770
[45] Date of Patent: Sep. 29, 1998

[54] IMAGE FORMING APPARATUS WITH INTERRUPTION FUNCTION

[75] Inventor: Noboru Ogino, Kawasaki, Japan

[73] Assignee: Kabushiki Kaisha Toshiba, Kawasaki, Japan

[21] Appl. No.: 928,338

[22] Filed: Sep. 12, 1997

[30] Foreign Application Priority Data

Sep. 20, 1996 [JP] Japan .................................. 8-250041

[51] Int. Cl.$^6$ ............................................... G03G 21/00
[52] U.S. Cl. ............................................ 399/87; 399/410
[58] Field of Search ............................ 399/87, 81, 82, 399/83, 85, 410

[56] References Cited

U.S. PATENT DOCUMENTS 4,623,244  11/1986  Andrews et al. ..................... 399/87
5,369,768  11/1994  Takano ................................. 399/87

Primary Examiner—R. L. Moses
Attorney, Agent, or Firm—Foley & Lardner

[57] ABSTRACT

When an interruption key is once depressed during a printing operation to instruct an interruption, an interruption flag is turned on to perform a delay interruption process. If the interruption key is depressed once again while the interruption flag is turned on (i.e. a delay interruption is awaited), an urgent interruption is determined and an interruption copying process is immediately performed.

16 Claims, 19 Drawing Sheets

COPYING OPERATION WITHOUT SORTING MODE(2COPIES OF A DOCUMENT CONSISTING OF 3 PAGES ARE MADE BY ADF)

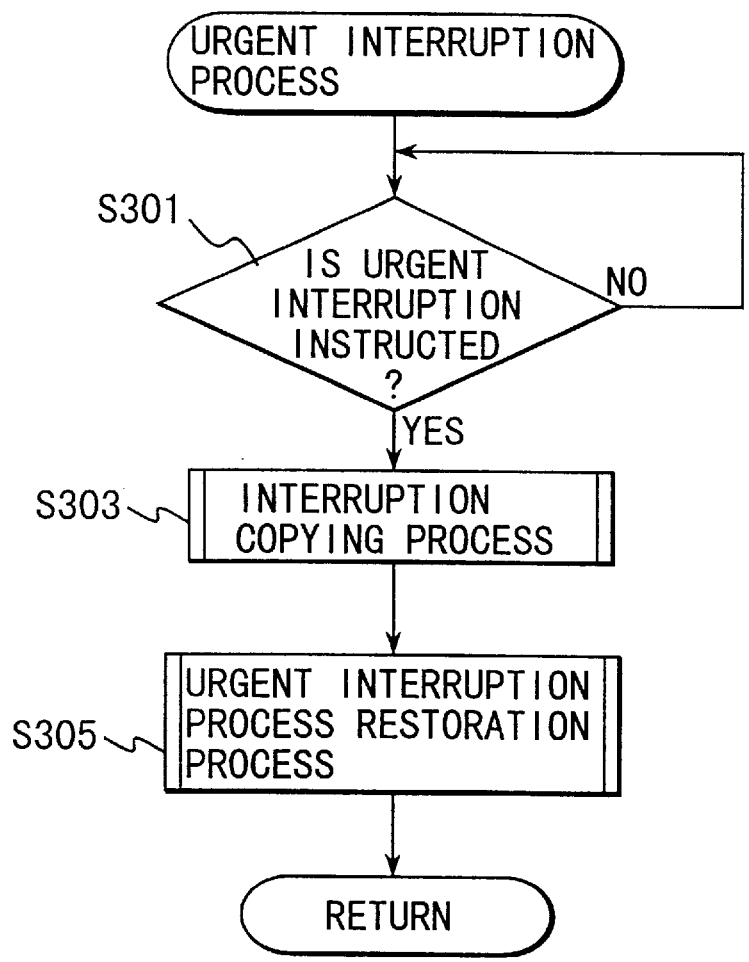
F I G. 21

IMAGE FORMING APPARATUS WITH INTERRUPTION FUNCTION

BACKGROUND OF THE INVENTION

The present invention relates to an image forming apparatus such as a digital copying machine, having an electronic sorting mode wherein original document images read from original documents fed onto an original document table by an automatic original document feeder or from original documents placed on the original document table are stored in a page memory, and the order of the images stored in the page memory is changed.

There is known an image forming apparatus wherein an image of an original document placed on an original document table is converted to an electric signal and printed on a paper sheet.

In the image forming apparatus having the page memory capable of storing a plurality of original document images, it is possible to set an electronic sorting mode wherein the order of read original documents is made different from the order of images to be output. For example, a plurality of copies of sheets, which have been printed out in a stable electronic sorting mode, are stapled by a stapler in units of a copy, and discharged to a tray.

In this type of imaging forming apparatus, if an interruption copying operation is instructed by interruption instruction means such as an interruption key during the printing process in the stable electronic sorting mode, the interruption copying operation is immediately performed. In this case, a sheet for the interruption operation is printed (copied) and discharged to the tray, in which sheets printed in the electronic sorting mode have already been discharged. Consequently, the operator, who instructed the interruption copying operation, needs to surely remove the sheet for the interruption operation. If the sheets printed in the electronic sorting mode are disordered while the sheet for the interruption operation is being removed, or if the operator forgets to remove the sheet for the interrupt operation, the sheet for the interrupt operation may be put among the sheets for the electronic sorting mode and erroneously stapled.

To solve this problem, there is proposed an image forming apparatus with a delay interrupt operation (delay interrupt process). In this type of image forming apparatus, an electronic sorting mode is suspended by interrupt instruction means such as an interrupt key to produce another copy (interrupt copy), thereby preventing a problem with the sheets printed in the electronic sorting mode.

For example, when an interrupt copying operation is instructed while a printing operation in the staple electronic sorting mode is being carried out, the printing in the staple electronic sorting mode is preferentially carried out until any one of a set number of copies, which is currently being printed, is completed. After the complete copy of sheets is stapled, i.e. after the printing of the complete copy is finished, the interrupt copy operation is enabled ("delay interrupt process").

However, in the case of the delay interruption mode, the interrupt copying operation is not permitted while any one of the set number of copies is being printed or the interrupt copying operation is delayed until the printing of any one of the set number of copies is completed. If a copy comprising a great number of sheets is being printed (or copied), it will take a great deal of time to start an interrupt operation even if an interrupt copy instruction is input. In case of an urgent interrupt copy, the operability of the image forming apparatus is low.

For example, if twenty-five (25) "A3" sheets are subjected to double-surface printing in the electronic sorting mode, the interrupt copying operation cannot be performed for about three minutes. In this case, the delay time of the interrupt copying operation is about three minutes, and the user must wait about three minutes after he/she inputs the interrupt copy instruction.

BRIEF SUMMARY OF THE INVENTION

The object of the present invention is to provide an image forming apparatus capable of performing image formation in case of an urgent interrupt, thus enhancing the operability.

According to an aspect of the present invention there is provided an image forming apparatus, comprising; means for reading images of a plurality of original documents to generate image data; means for storing image data generated by the reading means; means for forming images on an image forming medium on the basis of the image data so as to obtain a first set of image forming mediums and a second set of image forming mediums sequentially; first instruction means for instructing an interruption process; first process means for delaying the interruption process, when the interruption process has been instructed by the first instruction means while the image forming means is obtaining the first set of image forming mediums, until the image forming operation for the first set of the image forming mediums is completed, and for enabling the other image forming operation by the image forming means after the image forming operation for the first set of the image forming mediums and before the image forming operation for the second set of the image forming mediums; second instructing means for instructing an urgent interruption process; and second process means for interrupting the image forming operation even while the image forming means is obtaining the first set of image forming mediums when the urgent interruption process is instructed, and for enabling the other image forming operation by the image forming means.

According to another aspect of the present invention there is provided an image forming apparatus, comprising; means for reading images of a plurality of original documents to generate image data; means for storing image data generated by the reading means; means for forming images on an image forming medium on the basis of the image data so as to obtain a first set of image forming mediums and a second set of image forming mediums sequentially; first instruction means for instructing an interruption process; first process means for delaying the interruption process, when the interruption process has been instructed by the first instruction means while the image forming means is obtaining the first set of image forming mediums, until the image forming operation for the first set of the image forming medium is completed, and for enabling the other image forming operation by the image forming means after the image forming operation for the first set of the image forming medium and before the image forming operation for the second set of the image forming medium; second instructing means for instructing an urgent interruption process while the interruption process is being delayed by the first process means; and second process means for interrupting the image forming operation even while the image forming means is obtaining the first set of image forming mediums when the urgent interruption process is instructed, and for enabling the other image forming operation by the image forming means.

According to as aspect of the present invention there is provided an image forming apparatus, comprising; means for reading images of a plurality of original documents to generate image data; means for storing image data generated by the reading means; means for forming images on an image forming medium on the basis of the image data so as to obtain a first set of image forming mediums and a second set of image forming mediums sequentially; stapling process means for performing a stapling process for the image forming mediums on which the images have been formed by the image forming means; first instruction means for instructing an interruption process; first process means for delaying the interruption process, when the interruption process has been instructed by the first instruction means while the image forming means is obtaining the first set of image forming mediums, until the stapling process for the first set of the image forming mediums is completed, and for enabling the other image forming operation by the image forming means after the stapling process for the first set of the image forming mediums and before the image forming operation for the second set of the image forming mediums; second instructing means for instructing an urgent interruption process; and second process means for interrupting the image forming operation even while the image forming means is obtaining the first set of image forming mediums when the urgent interruption process is instructed, and for enabling the other image forming operation by the image forming means.

According to an aspect of the present invention there is provided an image forming apparatus, comprising; means for reading images of a plurality of original documents to generate image data; means for storing image data generated by the reading means; means for forming images on an image forming medium on the basis of the image data so as to obtain a first set of image forming mediums and a second set of image forming mediums sequentially; first process means for delaying the interruption process during an image formation operation for the first set of the image forming mediums, until the image formation operation for the first set of the image forming mediums is completed, and for enabling the other image forming operation by the image forming means after the image forming operation for the first set of the image forming mediums and before the image forming operation for the second set of the image forming mediums; and second process means for immediately performing an interruption process, while the interruption process is being delayed by the first process means.

According to an aspect of the present invention there is provided an image forming apparatus, comprising; means for reading images of a plurality of original documents to generate image data; means for storing image data generated by the reading means; means for forming images on an image forming medium on the basis of the image data so as to obtain a first set of image forming mediums and a second set of image forming mediums sequentially; first interruption instruction means for delaying the interruption process during an image formation operation for the first set of the image forming mediums, until the image formation operation for the first set of the image forming mediums is completed, and for instructing the other image forming operation by the image forming means after the image forming operation for the first set of the image forming mediums and before the image forming operation for the second set of the image forming mediums; and second interruption instruction means for immediately instructing an interruption process, while the interruption process is being delayed by the first interruption instruction means.

According to an aspect of the present invention there is provided an image forming apparatus, comprising; means for reading images of a plurality of original documents; means for forming images on an image forming medium on the basis of the image read by the reading means so as to obtain a first set of image forming mediums and a second set of image forming mediums sequentially; first instruction means for instructing an interruption process; means for delaying the interruption process, when the interruption process has been instructed by the first instruction means while the image forming means is obtaining the first set of image forming mediums, until the image forming operation for the first set of the image forming mediums is completed, and for enabling the other image forming operation by the image forming means after the image forming operation for the first set of the image forming mediums and before the image forming operation for the second set of the image forming mediums; second instructing means for instructing an urgent interruption process; and means for interrupting the image forming operation even while the image forming means is obtaining the first set of image forming mediums when the urgent interruption process is instructed, and for enabling the other image forming operation by the image forming means.

According to an aspect of the present invention there is provided an image forming apparatus, comprising; means for storing image data; means for forming images on an image forming medium on the basis of the image data so as to obtain a first set of image forming mediums and a second set of image forming mediums sequentially; first instruction means for instructing an interruption process; means for delaying the interruption process, when the interruption process has been instructed by the first instruction means while the image forming means is obtaining the first set of image forming mediums, until the image forming operation for the first set of the image forming mediums is completed, and for enabling the other image forming operation by the image forming means after the image forming operation for the first set of the image forming mediums and before the image forming operation for the second set of the image forming mediums; second instructing means for instructing an urgent interruption process; and means for interrupting the image forming operation even while the image forming means is obtaining the first set of image forming mediums when the urgent interruption process is instructed, and for enabling the other image forming operation by the image forming means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 21 is a flow chart illustrating an urgent interrupt operation.

DETAILED DESCRIPTION OF THE INVENTION

An embodiment of the present invention will now be described with reference to the accompanying drawings.

Specifically, a composite type image forming apparatus having three functions to serve as a copying machine (PPC), a facsimile machine (FAX) and a printer (PRT) will now be described.

Figure 1:
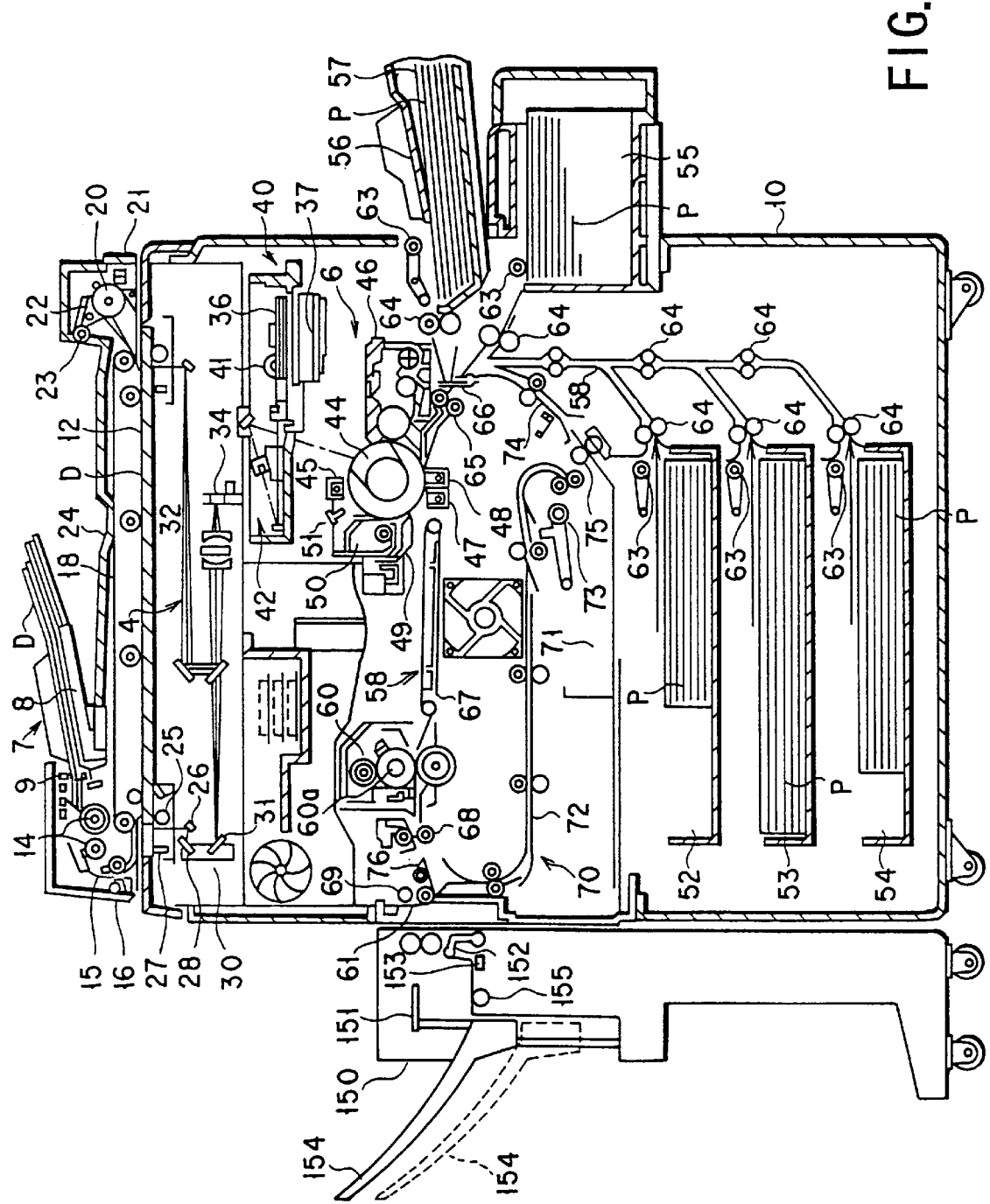
FIG. 1 schematically shows the structure of a digital copying machine according to an embodiment of the present invention.

FIG. 1 is a block diagram schematically showing the internal structure of a digital copying machine which is an example of the image forming apparatus of the present invention.

As is shown in FIG. 1, the digital copying machine comprises a body 10. The body 10 includes a scanner portion 4 serving as reading means (to be described later) and a printer portion 6 serving as image forming means.

An original-document retainer frame 12 comprising a transparent glass plate, on which an object to be read, i.e. original document D is placed, is formed on a top surface of the body 10. An automatic original document feeding apparatus (hereinafter referred to as "ADF") 7 for automatically feeding the original document onto the original-document retainer frame 12 is disposed on the top surface of the body 10. The ADF 7 can open and close with respect to the original-document retainer frame 12. The ADF 7 serves as an original-document retainer for keeping the original document D placed on the original-document retainer 12 in close contact with the original-document retainer frame 12.

The ADF 7 comprises an original-document tray 8 in which the original document D is set; an empty sensor 9 for detecting the presence/absence of the original document; a pickup roller 14 for picking up the original document sheets one by one from the original-document tray 8; a sheet supply roller 15 for conveying the picked-up original document; an aligning roller pair 16 for aligning the leading ends of the original document sheets; and a conveyance belt 18 disposed to cover substantially the overall body of the original-document retainer frame 12. The original documents set to face upward in the original-document tray 8 are successively fetched from the lowermost one, i.e. the final page. The original documents are aligned by the aligning roller pair 16 and then conveyed to a predetermined position on the original-document retainer frame 12.

In the ADF 7, a reverse roller 20, a non-reversion sensor 21, a flapper 22 and a sheet discharge roller 23 are disposed on the side opposite to the aligning roller pair 16, with the coveyance belt 18 interposed. The original document D, from which image information has been read by a scanner portion 4 (to be described later) is moved from the top surface of the original-document retainer frame 12 by the conveyance belt 18 and then discharged to the upper surface of an original-document discharge portion 24 on the upper surface of the ADF 7 through the reverse roller 20, the non-reversion sensor 21 and the flapper 22. In a case where the reverse side of the original document D is to be read, the flapper 22 is switched so that the original document D conveyed by the conveyance belt 18 is reversed by the reverse roller 20. Then, the original document D is returned to a predetermined position on the original-document retainer frame 12 by the conveyance belt 18.

The scanner portion 4 in the body 10 comprises an exposure lamp 25 serving as a light source for illuminating the original document D placed on the original-document retainer frame 12 and a first mirror 26 for deflecting light reflected by the original document D in a predetermined direction. The exposure lamp 25 and the first mirror 26 are attached to a first carriage 27 disposed below the original-document retainer frame 12.

The first carriage 27 is disposed movable in parallel to the original-document retainer frame 12 such that the first carriage 27 reciprocates below the original-document retainer frame 12 by a drive motor through a toothed belt or the like (not shown).

A second carriage 28 capable of moving in parallel to the original-document retainer frame 12 is disposed below the original-document retainer frame 12. Second and third mirrors 30 and 31 for successively deflecting light reflected by the original document D and deflected by the first mirror 26 are attached to the second carriage 28. The first and second mirrors 30 and 31 are situated perpendicular to each other. The second carriage 28 is driven to follow the first carriage 27 by means of a toothed belt or the like for driving the first carriage 27. The second carriage 28 is moved in parallel to the original-document retainer frame 12 at a speed which is half the speed of the first carriage 27.

An image forming lens 32 for converging light reflected by a third mirror 31 on the second carriage 28 and a CCD sensor 34 for receiving and photoelectrically converting reflected light converged by the image forming lens 32 are disposed below the original-document retainer frame 12. The image forming lens 32 is disposed movable, by means of a drive mechanism, in a plane including the optical axis for light deflected by the third mirror 31. When the image forming lens 32 is moved, reflected light is focused at a predetermined magnification. The CCD sensor 34 photoelectrically converts reflected light, which has been made incident upon the CCD sensor 34, so as to output an electric signal corresponding to the read original document D.

On the other hand, the printer portion 6 has a laser exposure unit 40 serving as latent image forming means. The laser exposure unit 40 has a semiconductor laser 41 serving as a light source, a polygonal mirror 36 serving as a scanning member for continuously deflecting laser beams emitted from the semiconductor laser 41, a polygonal mirror motor 37 functioning as a scanning motor for rotating the polygonal mirror 36 at a predetermined revolving speed (to be described later), and an optical system 42 for deflecting the laser beam deflected by the polygonal mirror 36 to introduce the laser beam to a photosensitive drum 44. The laser exposure unit 40 having the foregoing structure is secured and supported by a support frame (not shown) of the body 10.

The semiconductor laser 41 is turned on and off in accordance with image information of the original document D read by the scanner portion 4 or information of a document to be transmitted or received by the facsimile function. The laser beam emitted from the semiconductor laser 41 is, through the polygonal mirror 36 and the optical system 42, directed to the photosensitive drum 44 to scan the peripheral surface of the photosensitive drum 44. As a result, an electrostatic latent image is formed on the peripheral surface of the photosensitive drum 44.

The printer portion 6 has a rotatable photosensitive drum 44 serving as an image carrier disposed at the substantially central portion of the body 10. The peripheral surface of the photosensitive drum 44 is exposed to the laser beam emitted from the laser exposure unit 40 so that a desired electrostatic latent image is formed. Around the photosensitive drum 44, there are disposed an electrification charger 45 for charging the surface of the photosensitive drum 44 to have a predetermined charge. Moreover, the following units are disposed around the photosensitive drum 45 in the order as mentioned below: a development unit 46 for supplying toner or a developer to the electrostatic latent image formed on the surface of the photosensitive drum 44 to develop the electrostatic latent image with a desired image density; a transfer charger 48 integrally having a separation charger 47 for separating, from the photosensitive drum 44, a transfer member or copy sheet P fed from a sheet cassette (to be described later), the transfer charger 48 transferring the toner image formed on the photosensitive drum 44 to the sheet P; a separation claw 49 for separating the copy sheet P from the surface of the photosensitive drum 44; a cleaning unit 50 for cleaning toner left on the peripheral surface of the photosensitive drum 44; and a destaticizer 51 for destaticizing the surface of the photosensitive drum 44.

In the lower portion of the body 10, an upper cassette 52, a middle cassette 53 and a lower cassette 54, each of which can be drawn from the body 10, are disposed in a stacked state. The cassettes 52, 53 and 54 accommodate copying paper sheets having different sizes. A large-capacity feeder 55 is disposed on the side of the cassettes 52, 53 and 54. The large-capacity feeder 55 accommodates about 3,000 copying paper sheets P having, e.g. A4-size, which are frequently used. A paper feeding cassette 57 serving also as a manual sheet feeding tray 56 is disposed above the large-capacity feeder 55.

In the body 10, a conveyance passage 58 is formed to extend from each cassette and the large-capacity feeder 55 through a transfer portion formed between the photosensitive drum 44 and the transfer charger 48. A fixing unit 60 having a fixing lamp 60a is disposed at an end of the conveyance passage 58. A discharge port 61 is formed on the side wall of the body 10 opposite to the fixing unit 60. A single tray finisher 150 is attached to the discharge port 61.

Pickup rollers 63 for picking up, one by one, the copying paper sheets P from the cassette or the large-capacity feeder are disposed in the vicinity of the upper cassette 52, the middle cassette 53, the lower cassette 54, the paper supply cassette 57 and the large-capacity feeder 55. A number of paper feeding roller pairs 64 for conveying, through the conveyance passage 58, the copying paper sheets P extracted from the pickup rollers 63 are disposed in the conveyance passage 58.

In the conveyance passage 58, a resist roller pair 65 is disposed upstream from the photosensitive drum 44. The resist roller pair 65 corrects an inclination of the extracted copying paper sheet P and aligns the leading end of the toner image on the photosensitive drum 44 and the leading end of the copying paper P to each other, and then feeds the copying paper sheet P to the transfer portion at the same speed as the rotational speed of the photosensitive drum 44. In front of the resist roller pair 65, that is, at a position the paper supply roller 64, a pre-alignment sensor 66 is disposed to detect arrival of the copying paper sheet P.

The copying paper sheets P, extracted one by one from each cassette or large-capacity feeder 55 by the pickup roller 63, is moved from the paper supply roller pairs 64 to the resist roller pair 65. Then, the leading end of the copying paper sheet P is aligned by the resist roller pair 65, and then transferred to the transfer portion.

in the transfer portion, a developer image, i.e. a toner image, formed on the photosensitive drum 44 is transferred onto the copying paper sheet P by the transfer charger 48. The copying paper sheet P, to which the toner image has been transferred, is separated from the surface of the photosensitive drum 44 by the operations of the separation charger 47 and the separation claw 49, and then conveyed to the fixing unit 60 through a conveyance belt 67 forming a portion of the conveyance passage 52. Then, the developer image is melted and fixed to the copying paper P by the fixing unit 60. Then, the copying paper sheet P is allowed to pass through a discharge port 61 by a paper supply roller pair 68 and a paper discharge roller pair 69, and then discharged to the upper surface of the finisher 150.

An automatic double-side unit 70 is disposed below the conveyance passage 58 to reverse the copying paper sheet P, which has passed through the fixing unit 60, and to feed the copying paper P back to the resist roller pair 65. The automatic double-side unit 70 has a temporary collecting portion 71 for temporarily collecting the copying paper sheet P; a reverse passage 72, branched from the conveyance passage 58, for reversing the copying paper sheet P, which has passed through the fixing unit 60, and guiding the sheet P to the temporary collecting portion 71; a pickup roller 73 for extracting, one by one, the copying paper sheets P collected in the temporary collecting portion; and a paper supply roller 75 for feeding the extracted paper sheet P through the conveyance passage 74 to the resist roller pair 65. An assigning gate 76 for selectively assigning the copying paper sheet P to the discharge port 61 or the reverse passage 72 is disposed in a branched portion between the conveyance passage 58 and the reverse passage 72.

When a double-side copying operation is performed, the copying paper P, which has passed through the fixing unit 60, is introduced into the reverse passage 72 by the assigning gate 76. Thus, the copying paper P in the reversed state is temporarily collected in the temporary collecting portion 71, and then fed to the resist roller pair 65 through the conveyance passage 74 by the pickup roller 73 and paper supply roller pair 75. Then, the copying paper sheet P is aligned by the resist roller pair 65 and then conveyed again to the transfer portion so that a toner image is transferred to the reverse side of the copying paper sheet P. Then, the copying paper sheet P is discharged to the finisher 150 through the conveyance passage 58, fixing unit 60 and discharge roller 69.

The finisher 150 staples each copy of the discharged document and collects the stapled copies. Whenever one copying paper sheet P to be stapled is discharged from the discharge port 61, the sheet is moved to the stapling portion by a guide bar 151 so as to be aligned. After all the sheets have been discharged, a paper retaining arm 152 retains each copy of the discharged copying paper sheet P, and then a stapler unit 153 staples the sheets. Then, the guide bar 151 is moved downwards and the stapled copy of the copying paper P is discharged to a finisher discharge tray 154 by a finisher discharge roller 155. The finisher discharge tray 154 is provided with a discharge tray sensor 154a for sensing the presence/absence of sheet P on the finisher discharge tray 154. The amount of downward movement of the finisher discharge tray 154 is determined to a certain extent in accordance with the number of the copying paper sheets P, so that the finisher discharge tray 154 is moved downward in a stepped manner whenever one copy is discharged. The guide bar 151 for aligning the copying paper sheet P to be discharged is disposed at a vertical position so determined as not to come in contact with the stapled copying paper sheet P which has been placed on the finisher discharge tray 154.

The finisher discharge tray 154 is connected to a shifting mechanism (not shown) for shifting the sheets P in units of a copy in a sorting mode (for example, in four directions, to the right, left, front and rear).

An operation panel 80 for inputting a variety of copying conditions and copy start signal for starting the copying operation is disposed in the upper portion of the front surface of the body 10.

Figure 2:
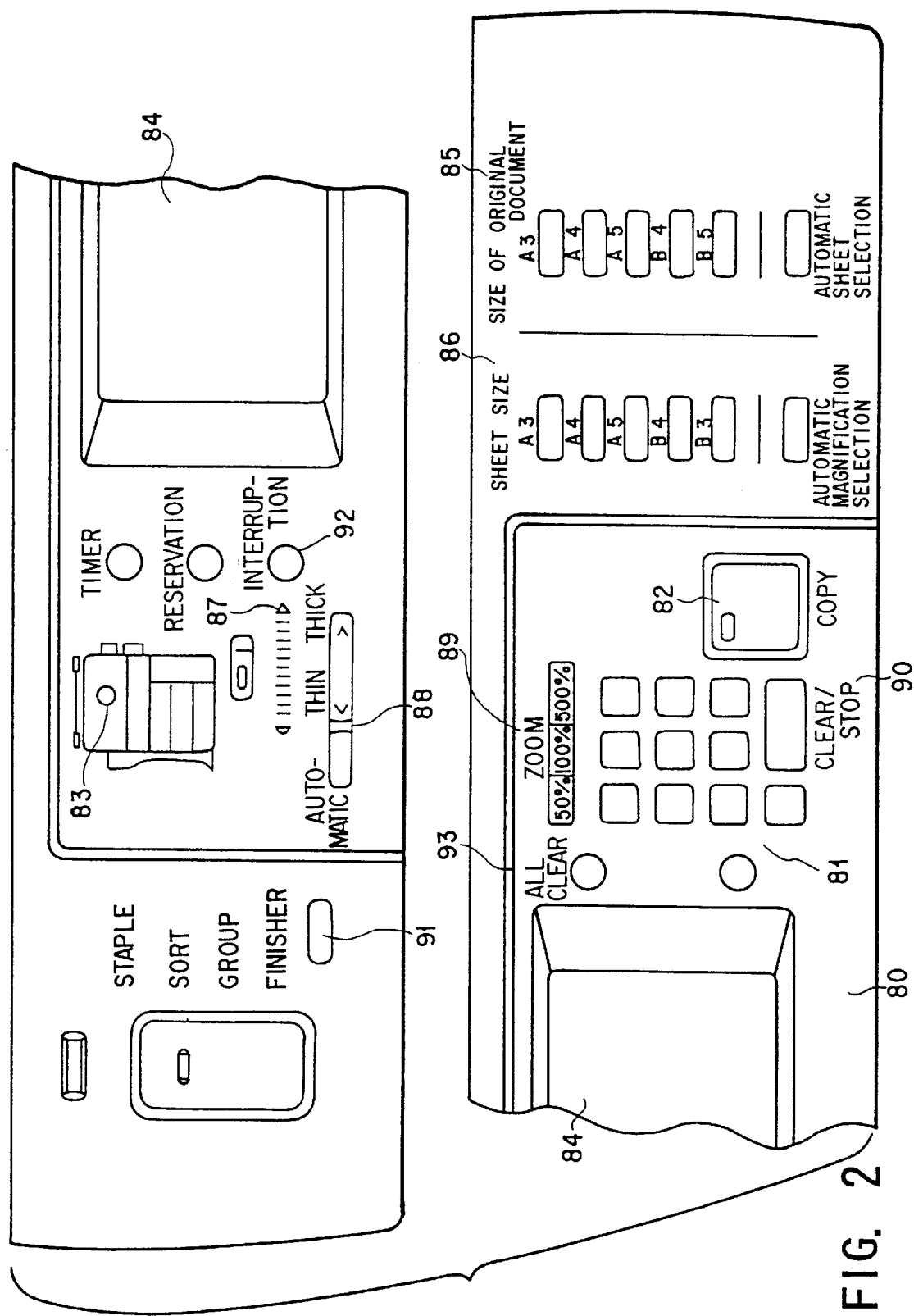
FIG. 2 is a plan view of the structure of an operation panel.

As shown in FIG. 2, the operation panel 80 has a ten-key pad 81, a copy key 82, a state display portion 83, a liquid crystal display (LCD) portion 84, an original document size setting key 85, a paper-size setting key 86, a density display portion 87, a density setting key 88, a magnification setting key 89, a clear/stop key 90, a finisher key 91, an interruption key 92 and an all-clear key 93.

The ten-key pad 81 is used to set the number of original document sheets and the number of sheets to be copied.

The copy key 82 is used to instruct the start of the copying operation.

The state display portion 83 gives guidance and displays a state of selection of the paper feeding cassette, the occurrence of a jam of the original document or paper sheets, and the like.

The LCD portion 84 displays the number of original documents sheets and the number of sheets to be copied. In addition, the LCD portion 84 displays a copying magnification, factors required to perform an editorial operation and various operation guides. The LCD portion 84 has a touch panel with which a variety of operation instructions can be input. For example, an end key and a suspension key are displayed in the electronic sorting mode so as to instruct the end or the suspension of the operation.

The original document size setting key 85 is used to set the size of the original document D.

The paper-size setting key 86 is used to set the size of the paper P.

The density display portion 87 displays the copying density to be set by the density setting key 88.

The magnification setting key 89 is used to set the copying magnification.

The clear/stop key 90 is used to clear the contents set by using the ten-key pad 81 to restore the standard state.

The finisher key 91 is used to set a staple mode, a sort mode and a group sort mode.

The interruption key 92 is a key for setting the interruption copying operation.

The all-clear key 93 is a key with which suspension of the operation is instructed.

Referring to FIGS. 3 to 6, a circuit for controlling the image forming apparatus will now be described.

Figure 3:
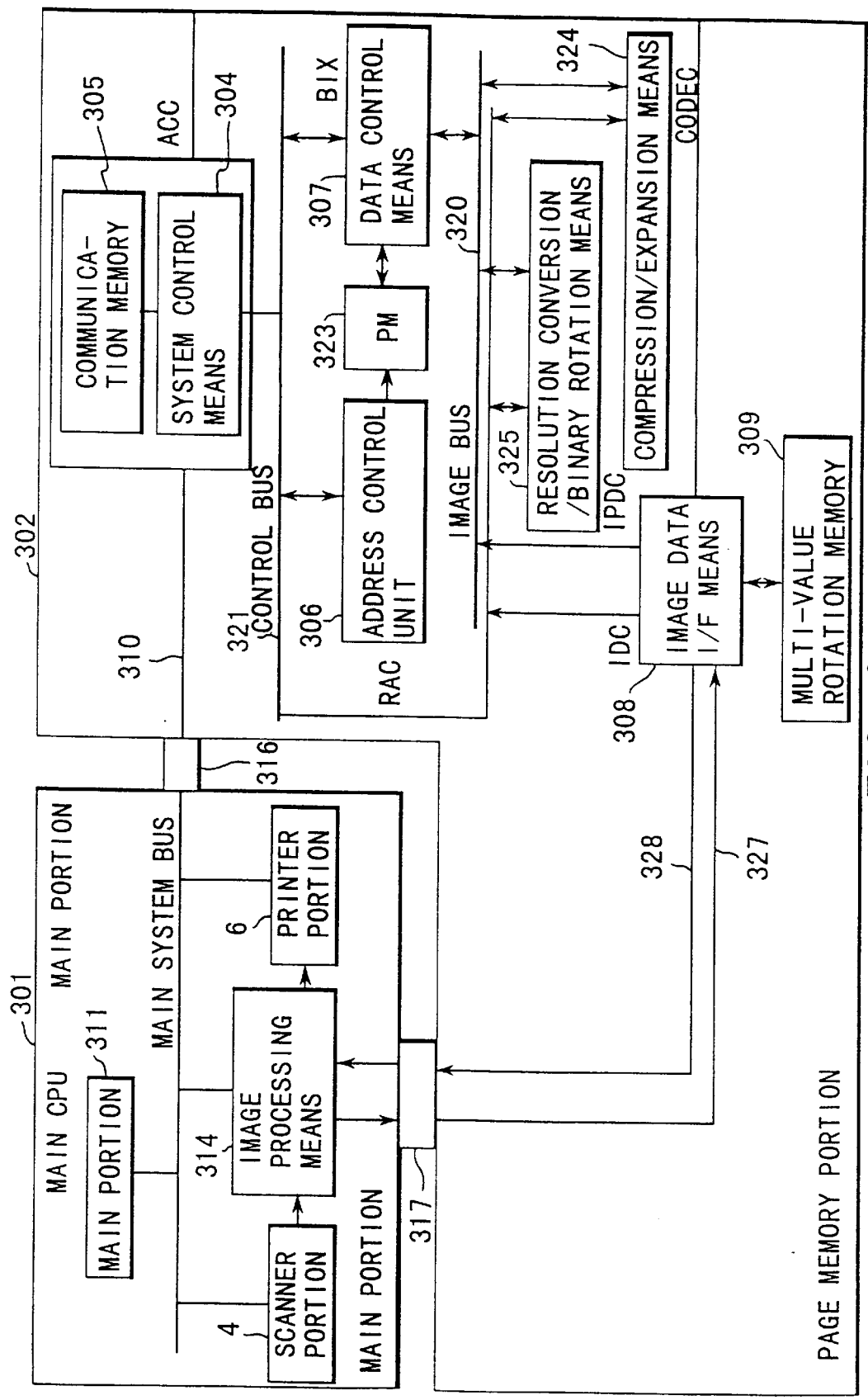
FIG. 3 is a block diagram schematically showing the structure of a digital copying machine control system.
Figure 4:
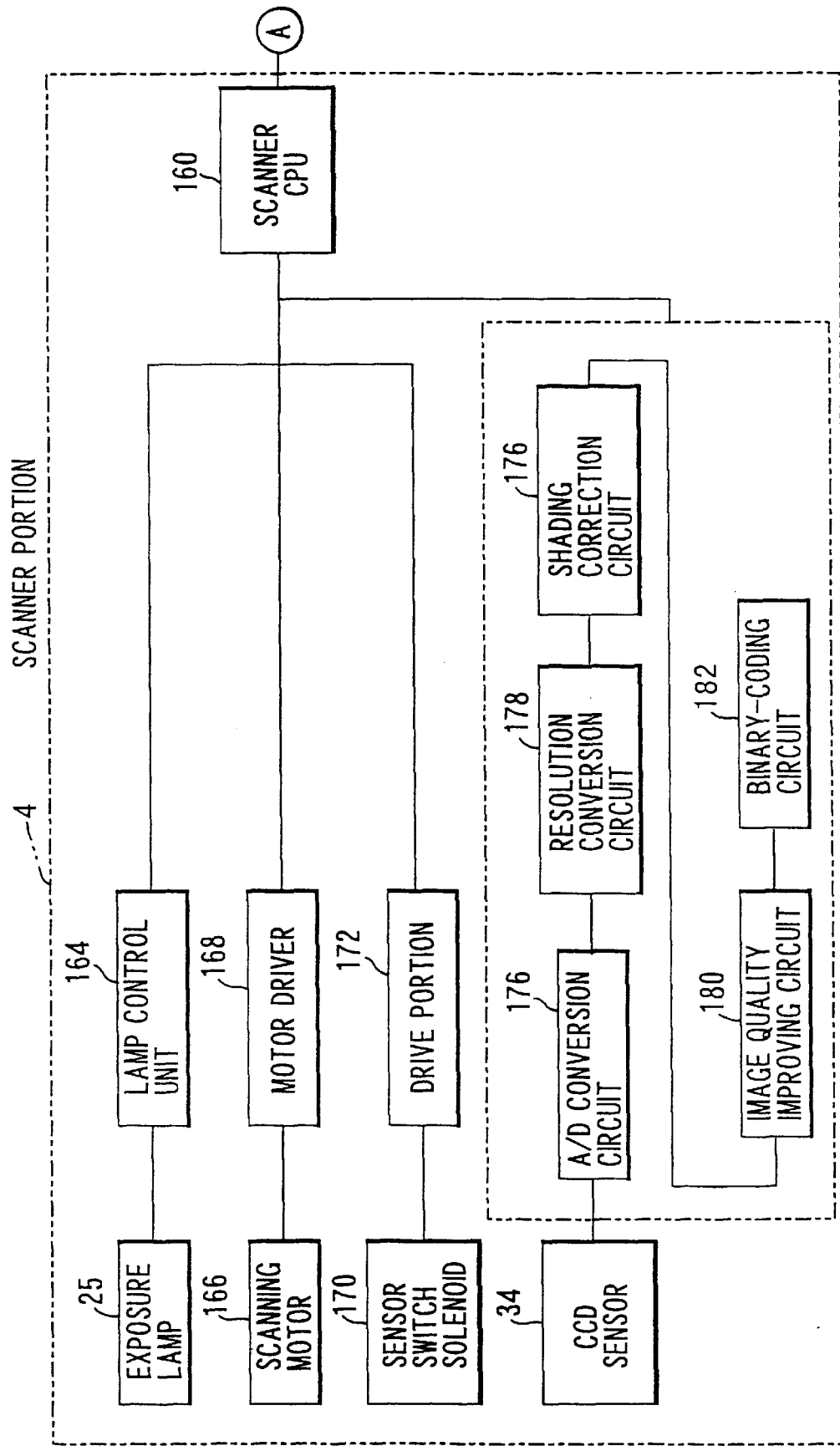
FIG. 4 is a block diagram schematically showing the structure of a scanner portion.
Figure 5:
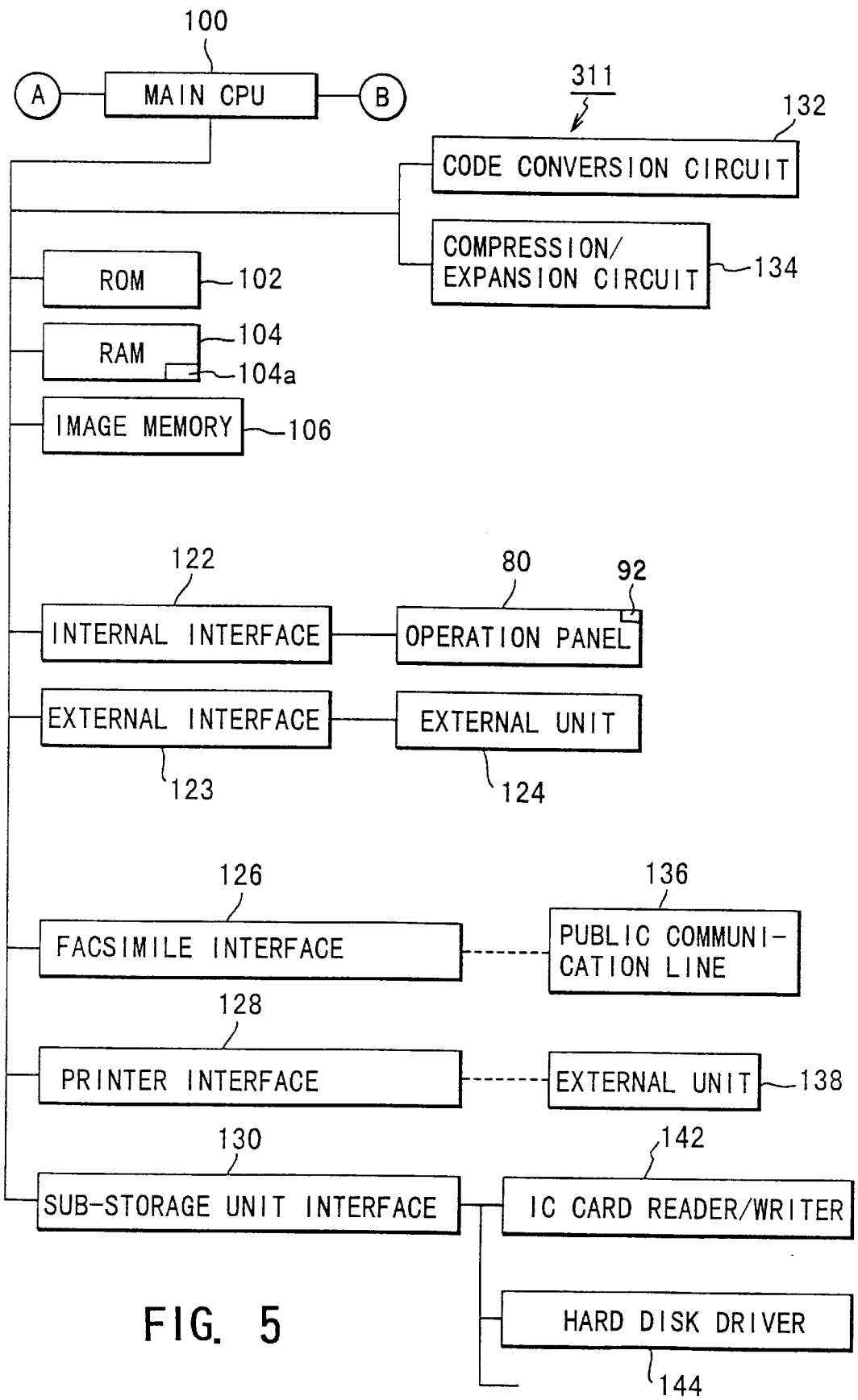
FIG. 5 is a block diagram schematically showing the structure of a central CPU.
Figure 6:
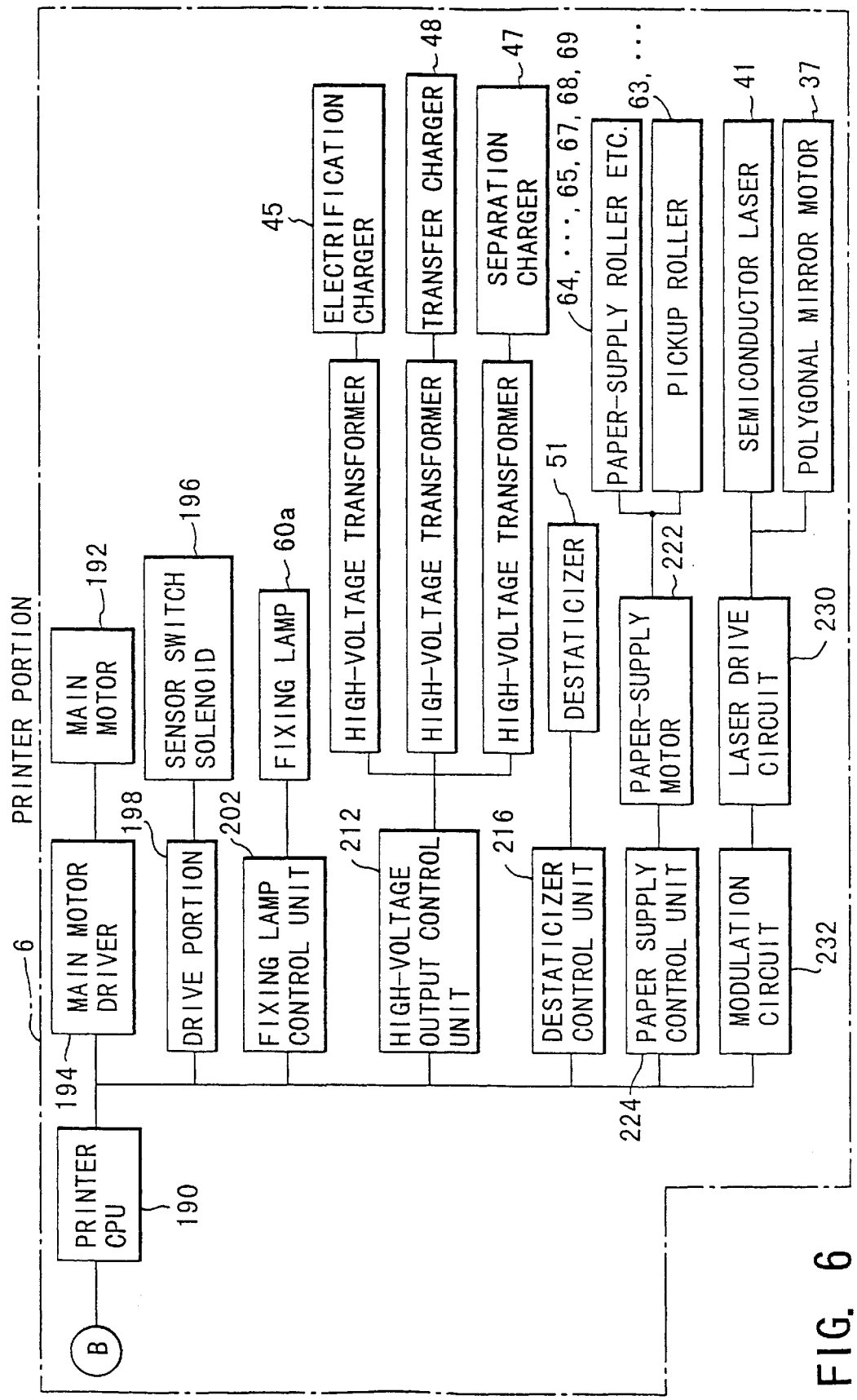
FIG. 6 is a block diagram schematically showing the structure of a printer portion.

FIG. 3 is a schematic block diagram showing the structure of a system for controlling the image forming apparatus, such as the digital copying machine, according to the embodiment of the present invention. FIG. 4 shows the scanner portion, FIG. 5 shows a central CPU and FIG. 6 shows the printer portion.

The system for controlling the digital copying machine comprises two major blocks consisting of a central portion 301 having image processing means 214 for establishing the connection between the scanner portion 4 and the printer portion 6 and forming the digital copying machine; and a page memory portion 302 for receiving image data from the central portion 301 and storing image data so as to again transfer stored image data to the central portion 301 so that a memory copying operation (an electronic sorting mode) is enabled.

The central portion 301 and the page memory portion 302 are connected to each other by a central portion system interface 316 for communicating control data and a central portion image interface 317 for communicating image data.

The central portion 301 comprises the input means (a scanner portion) 4, the output means (a printer portion) 6, the image processing means 314 and control means (the central CPU) 311 for controlling the units above.

The control means (the central CPU) 311 has a main CPU 100 to which the following units are connected: a ROM 102, a RAM 104, an image memory 106, an internal interface 122, an external interface 123, a facsimile interface 126, a printer interface 128, a sub-storage unit interface 130, a code conversion circuit 132 and a compression/expansion circuit 134. The operation panel 80 is connected to the internal interface 122. An external unit 124 is connected to the external interface 123, a public communication line 136 is connected to the facsimile interface 126, an external unit 138 is connected to the printer interface 128, and an IC card reader/writer 142, a hard disk drive 144 and so forth are connected to the sub-storage unit interface 130.

Image information is stored/called by the main CPU 100. In a case where image information is stored for example, image information read by the scanner portion 4 under control of the scanner CPU 160 is stored in an image memory 106 to follow an instruction issued from the main CPU 100. The instruction from the main CPU 100 is performed in a state wherein the mode has been determined in accordance with an input performed with the operation portion (key input).

A parameter table 104a is set in the RAM 104. The parameter table 104a is designed to store copying conditions set with the operation panel 80 or the like. specified values correspond to non-set conditions. The parameters for the copying conditions are the number of copies, the size of the original document, the size of the sheet, the magnification, the sorting mode, and the like.

The detailed structure of the scanner portion 4 will now be described with reference to FIG. 4. The scanner CPU 160 of the scanner portion 4 is connected to, and controls, a lamp control unit 164 for controlling the exposure lamp 25, a motor driver 168 for controlling the scanning motor 166 and a drive portion 172 for operating and controlling sensors, switches and solenoids 170. In addition, the scanner CPU 160 is connected to, and controls, an A/D conversion circuit 176, a resolution conversion circuit 178, a shading correction circuit 176, an image-quality improving circuit 180 and a binary-coding circuit 182, which process image information supplied from the CCD sensor 34.

Referring to FIG. 6, the printer portion 6 will now be described in detail. The printer portion 6 has a printer CPU 10 to which the following units are connected so as to be controlled: a main motor driver 194 for driving a main motor 192; a drive portion 198 for operating and controlling sensors, switches and solenoids 196; a fixing lamp control unit 202 for controlling the fixing lamp 60*a*; a high-voltage output control unit 212 for controlling and applying high voltages supplied from high-voltage transformers 213, 214 and 216 to the electrification charger 45, the transfer charger 48 and the separation charger 47; a destaticizer control unit 216 for controlling the destaticizer 51; a paper-supply control unit 224 for controlling a paper-supply motor 222 for the paper supply roller pairs 64, resist roller pair 65, conveyance belt 67 and discharge roller pair 69; and a modulation circuit 323 for controlling a laser drive circuit 230 for the semiconductor laser 41 and polygonal-mirror motor 37.

The page memory portion 302 will now be described with reference to FIG. 3. The page memory portion 302 has a system control means 304 for controlling the access from the central portion 301 to the page memory 323 and includes a communication 305; storage means (page memory) 323 for temporarily storing image data; an address control unit 306 for generating the address in the page memory 323; an image bus 320 for transferring data among the devices in the page memory portion 302; a control bus 321 for transferring control signals among the devices in the page memory portion 302 and the system control means 304; data control means 307 for controlling data transfer when the data transfer is performed between the page memory 323 and another device through the image bus 320; image data I/F means 308 for interfacing image data when image data is communicated with the central portion 301 through the central portion image interface 317; a resolution conversion/binary rotation means 325 for converting the resolution into a resolution of another unit when image data is transmitted to the unit having the different resolution, converting the resolution of image data received from a unit having a different resolution into the resolution of the printer 315 of the central portion 301 and performing a 90-degree rotation process of binary-coded image data; compression/expansion means 324 for compression and transmitting supplied image data for a device for performing facsimile transmission or optical disk storage such that image is compressed so as to be transmitted or stored and expanding compressed image data to make the same visible through the printer 315; and a multi-value rotation memory 309 connected to the image data I/F means 308 and used when image data is rotated by 90° or –90° when image data is printed out from the printer portion 6.

Figure 7:
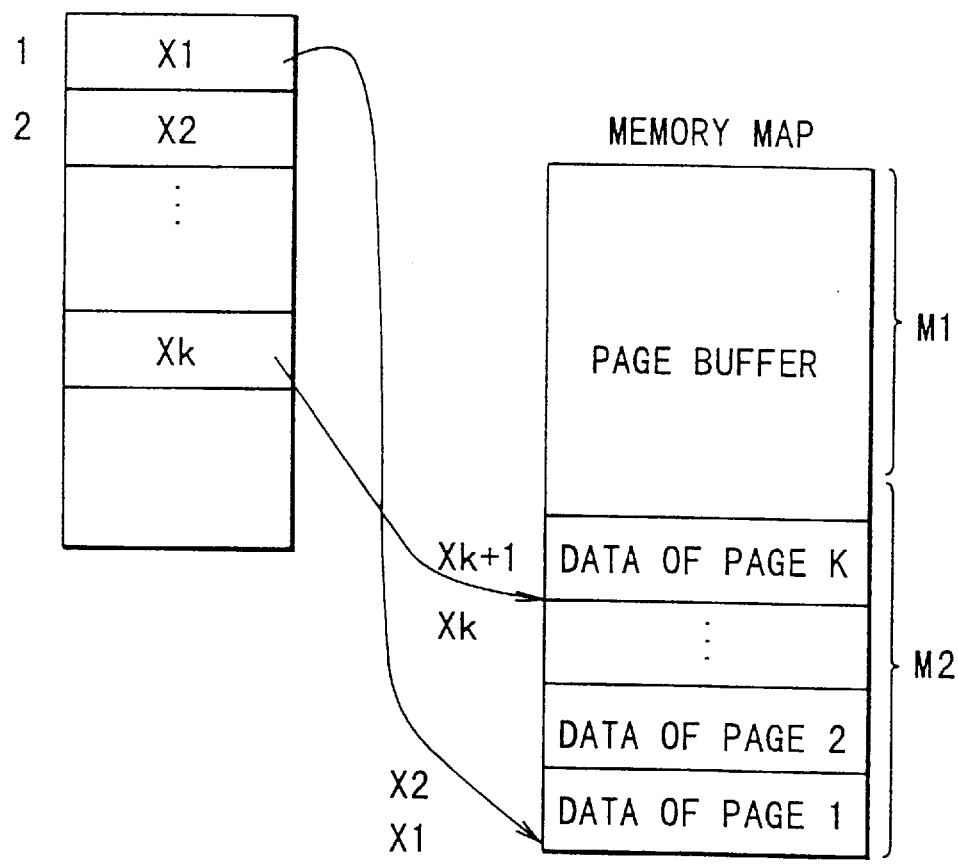
FIG. 7 is a diagram showing the relationship between a page buffer region M1 and a file area M2 of a page memory.

As is shown in FIG. 7, the page memory 323 is sectioned into a page buffer region M1 on which image data of an original document read by the scanner portion 4 is written and a file area M2 on which data formed by compressing the foregoing image data is written and which is sectioned for each page.

The leading address of each page in the file area M2 is stored in data leading address storage region M3 for each file area page.

The electronic staple sorting mode will now be described with reference to FIGS. 8 and 9.

A case will be considered in which two copies of a document consisting of 3 pages are to be obtained.

Figure 8:
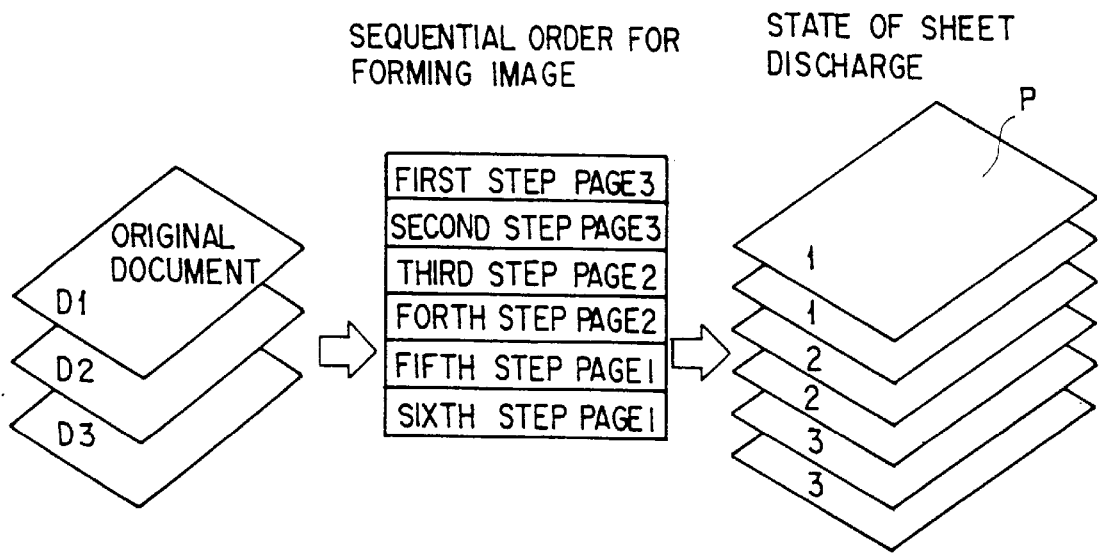
FIG. 8 is a block diagram for explaining a copying operation without a sorting mode.

When a copying operation is performed without sorting, the original document D is conveyed, as shown in FIG. 8, from the ADF 7 to the original document reading position in a sequential order of sheets D3, D2 and D1. Then, the operation for reading the original document performed by the scanner portion 4 and the printing operation performed by the printer portion 6 are combined to form images on the copying paper sheets P in the sequential order of page 3, page 3, page 2, page 2, page 1 and page 1. The copying paper sheets P on which images have been formed are stacked onto the finisher discharge tray 154 in a sequential order of page 1, page 1, page 2, page 2, page 3 and page 3.

Figure 9:
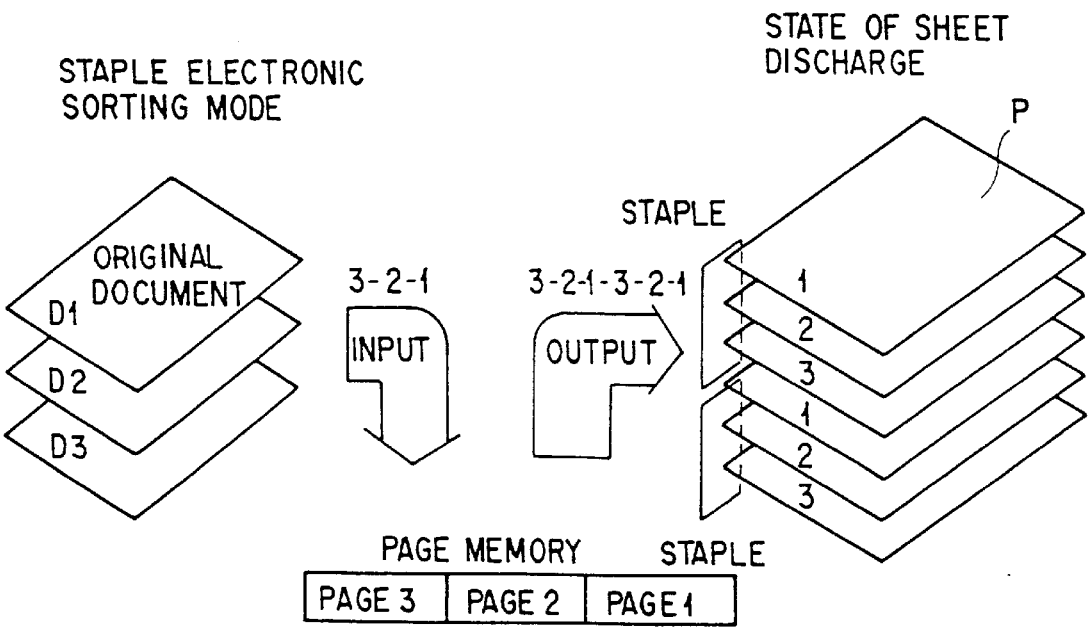
FIG. 9 is a block diagram showing a copying operation in an electronic staple sorting mode.

When a copying operation is performed, as shown in FIG. 9, in the electronic staple sorting mode, the original document D is conveyed from the ADF 7 to the original document reading position in a sequential order of page D3, page D2 and page D1. Then, the images are read into the page memory 323 by the scanner portion 4 in the sequential order of page 3, page 2 and page 1. Then, the pages 3, 2 and 1 in this sequential order are output from the page memory 323 to the printer portion 6 and then stapled and discharged to the finisher discharge tray 154. The copying paper sheets P discharged to the finisher discharge tray 154 have been stapled in the sequential order as page 1, page 2 and page 3. Thus, the operator is able to obtain two stapled copies of the document.

The overall operation of the digital copying machine will now be described with reference to flow charts of FIGS. 10 to 19.

Figure 10:
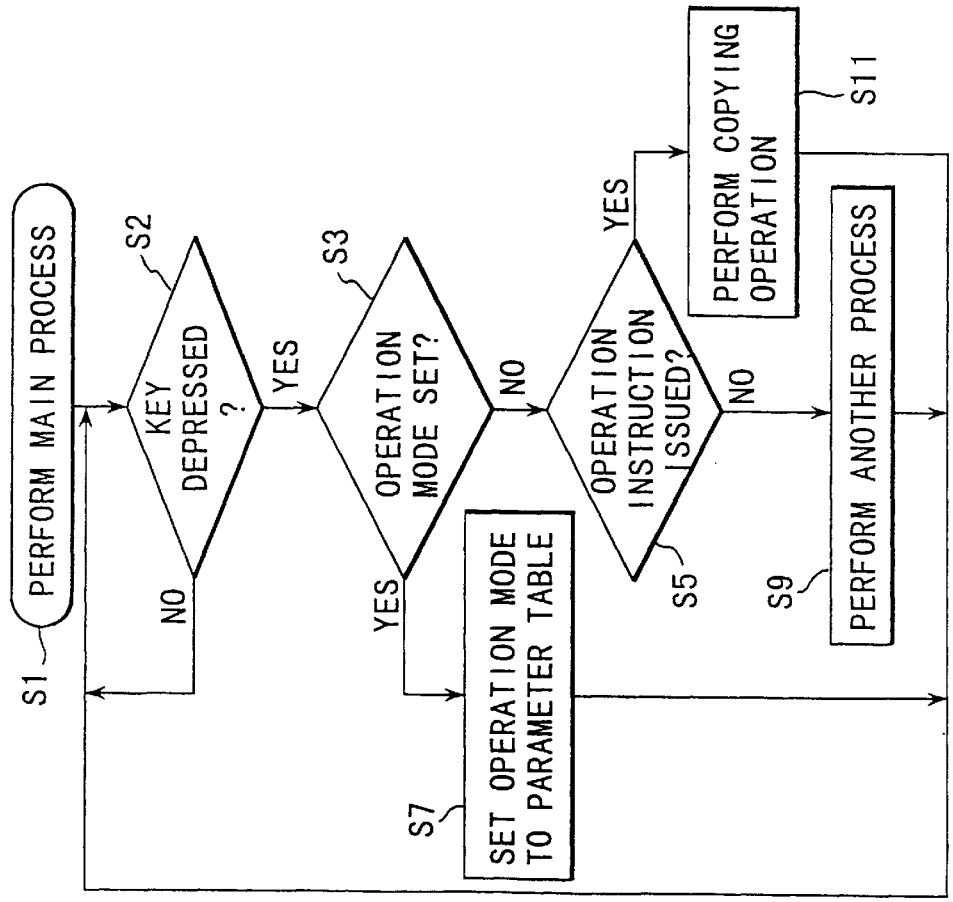
FIG. 10 is a flow chart illustrating a main process.

A main process (S1) will now be described with reference to FIG. 10.

If the operator has depressed a key on the operation panel 80 (S2) and the key depression is performed to set an operation mode (S3), the instructed copying mode is written in the parameter table 104*a* (S7). Thus, the number of copies, the size of the original document, the size of the sheets, the magnification and the sorting mode are stored. It is assumed that predetermined values have been set to the parameter table 104*a* when the apparatus has been turned on. Thus, the predetermined values are employed as copying parameters which are not instructed.

When the copy key 82 on the operation panel 80 is depressed (S5), the copying operation is performed (S11).

Note that another process (S9) is a process which does not correspond to the copying operation or the operation for setting the copying mode, this process (S9) including a process for setting a timer and a preheating process.

Figure 11:
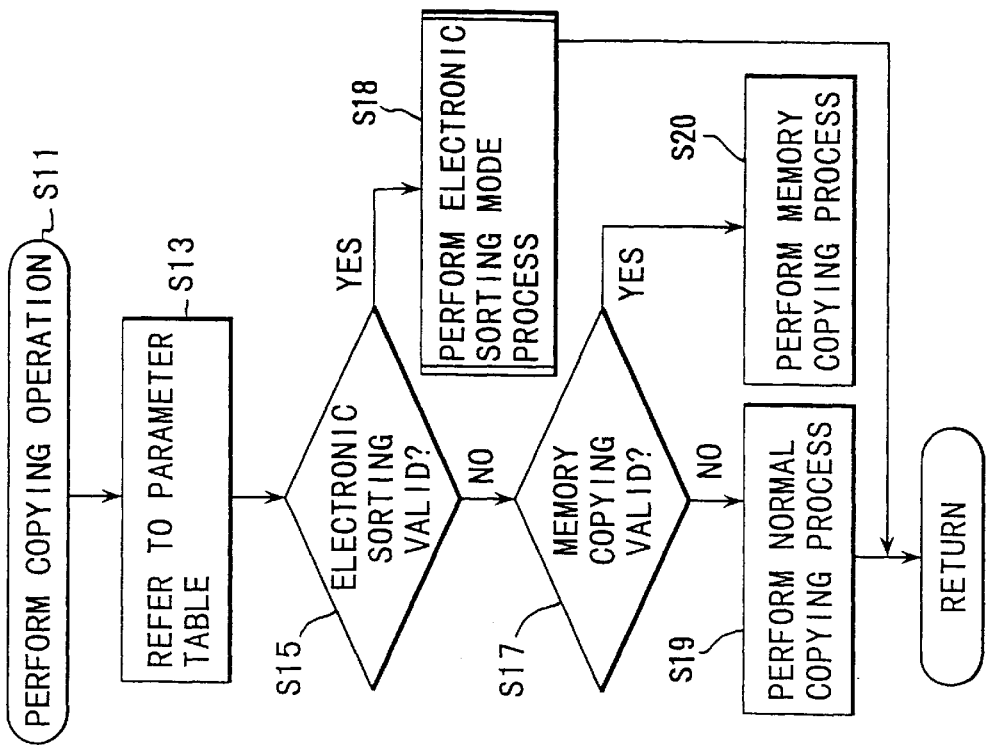
FIG. 11 is a flow chart illustrating a copying operation.

The copying operation (S11) will now be described with reference to the flow chart shown in FIG. 11.

The operation of a digital copying machine of the type according to this embodiment, which has the page memory 323 to enable the operation in the electronic sorting mode to be performed, is mainly divided into an electronic sorting mode operation in which images are stored in the page memory 323 and the images are printed in the sorting mode; a memory copying operation in which images are temporarily stored in the memory so as to be printed as it is; and a normal copying operation in which the memory is not used and the supplied images of the original document are directly printed. Thus, the type of the set copying process is determined when the copying operation starts the set copying operation.

Specifically, the parameter table 104a (S13) is referred to, in order to determine whether the electronic sorting mode is valid (S15). If it is determined that the electronic sorting mode is valid, the electronic sorting mode process is performed (S18). If the electronic sorting mode is invalid, it is determined whether the memory copying operation is valid (S17). If it is determined that the memory copying operation is valid, the memory copying process is performed (S20). If the memory copying operation is invalid, the normal copying process is performed (S19).

In the normal copying process, an output of the CCD sensor 34 of scanner portion 4, which is produced when the CCD sensor has read the original document D, is not stored in the page memory 323 but is printed out by the printer portion 6. If five copies are to be obtained, the original document D needs to be scanned five times.

Figure 12:
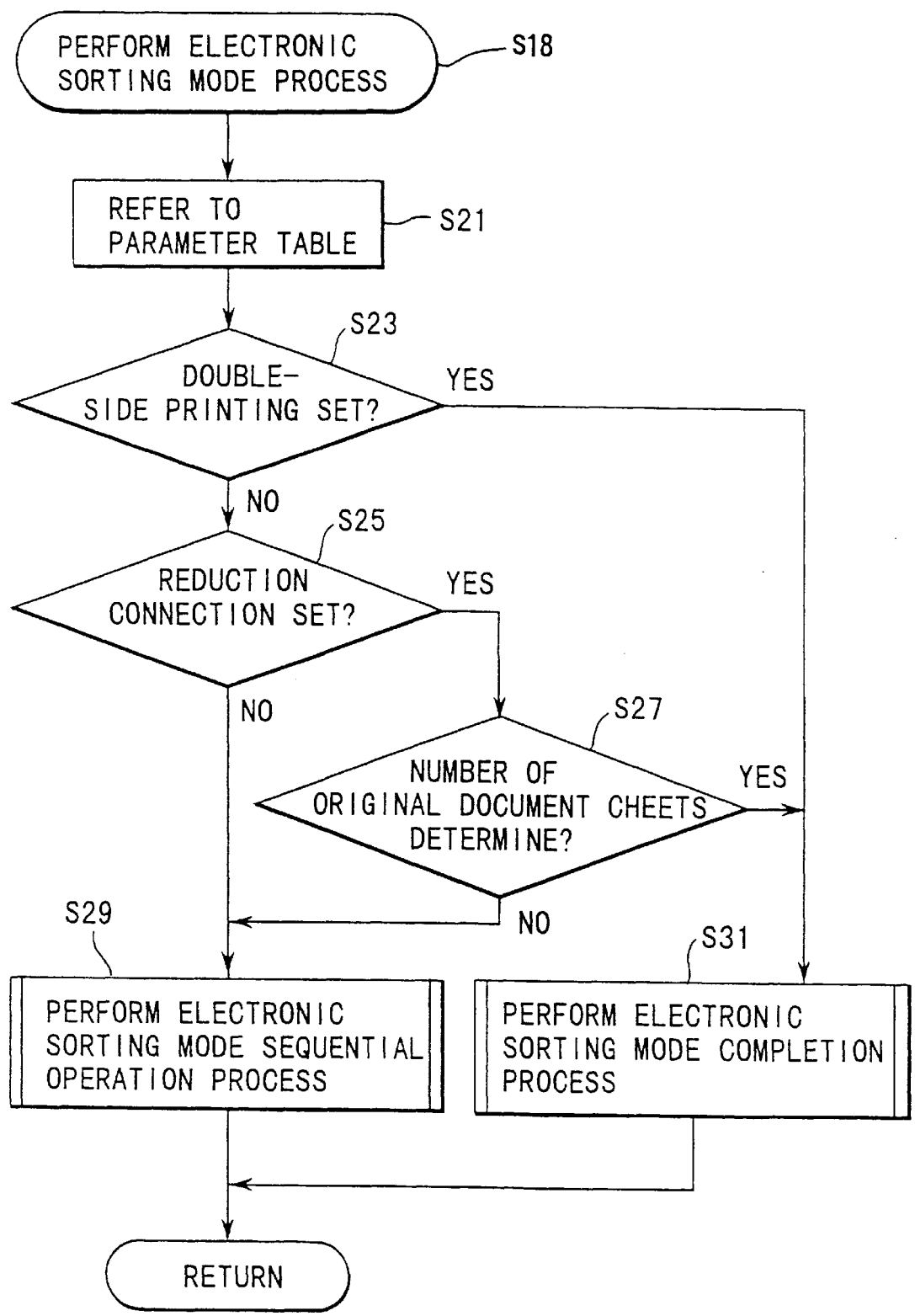
FIG. 12 is a flow chart illustrating an electronic sorting mode process.

The electronic sorting mode process (S18) will now be described with reference to a flow chart of FIG. 12.

At first, the parameter table 104a (S21) is referred to. If the double-side printing has been set or if a reduction connection mode is set and the number of the original document sheets to be supplied is undetermined (S23, S25 and S27), an electronic sorting mode completion process is performed wherein all of the original document sheets D are read and then the printing operation is performed (S31). If another setting is performed, an electronic sorting mode sequential process is performed (S29).

In the electronic sorting mode completion process (S31), the original document sheets D are sequentially read by the scanner portion 4, read image data is stored in the page memory 323, and after image data of all sheets of the original document D has been stored in the page memory 323, image data stored in the page memory 323 is sequentially read (e.g. by changing the sequential order of pages) to print out the image by the printer portion 6.

In the electronic sorting mode sequential process, a first copy is obtained by sequentially reading the original document sheets D by the scanner portion 4 to store read images in the page memory 323 and print out the images by the printer portion 6; and second and following copies are obtained by sequentially reading image data stored in the page memory 323 to print out the images by the printer portion 6.

The electronic sorting mode completion process (S31) will now be described with reference to a flow chart of FIG. 13.

At first, the parameter table 104a is referred to, in order to set the operation mode of the finisher 150 (S35). The finisher 150 has operation modes consisting of a sorting mode, a staple mode, a group mode and a non-sort mode. The group mode and the non-sort mode are omitted from description.

The number of the page memory 323 for reading and storing images is initialized (S37). The page memory 323 is sectioned, as shown in FIG. 7, into the page buffer region M1 on which image data of the original document D read by the scanner portion 4 is written and the file area M2 on which data obtained by compressing the image data is written and which is sectioned for each page. Thus, a reference is made to the leading address for each page of the file area in the sequential order of the number of the page memory 323.

When reading of the original document is commenced, the empty sensor 9 in the ADF 7 is checked (39). If original document D exists, a completion operation ADF input process is carried out (S41).

If the original document D does not exist, the original document D placed on the original-document retainer frame 12 is scanned by the scanner portion 4 to store page data (image data) on the page buffer region M1 (S49). Then, page data on the page buffer region M1 is compressed and stored in the file area M2, followed by writing the storage address to the page memory number (S51 and S53).

Then, key input is checked (S55). If start of input is instructed (S57), image reading is performed once again. If the end of input is instructed, the original document input process is completed and an electronic sorting mode printing process is performed (S45). If suspension is instructed (S61), data in the page memory 323 is cleared and the electronic sorting mode process is completed (S47). If interruption is instructed (S63), the interruption copying process is performed (S65) and then the operation returns to waiting for key input. If an instruction except the foregoing is issued, a process similar to that performed when no key has been depressed is performed.

Figure 14:
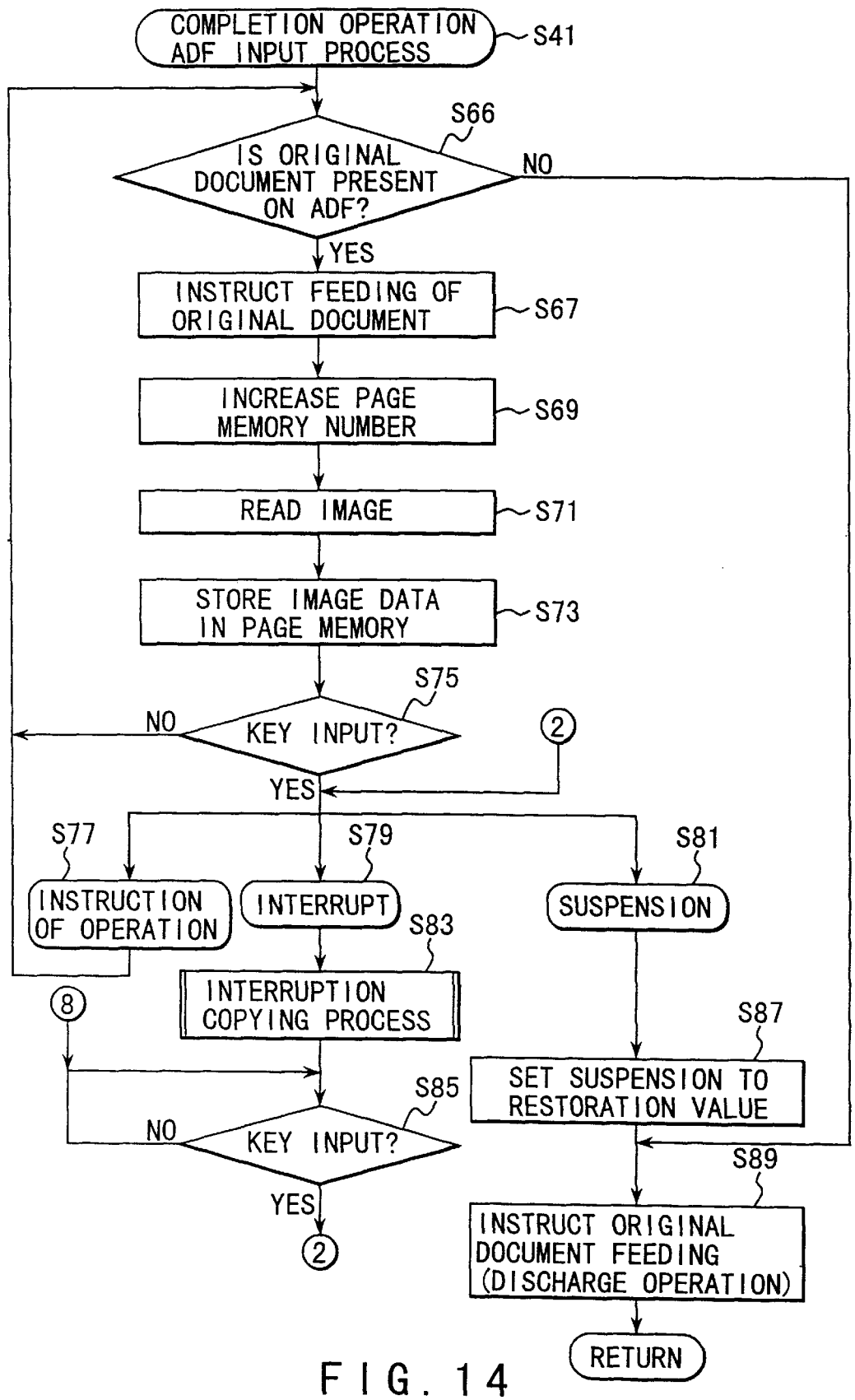
FIG. 14 is a flow chart illustrating a process of inputting completion of operation to an ADF.

The completion operation ADF input process (S41) will now be described with reference to a flow chart of FIG. 14.

Figure 13:
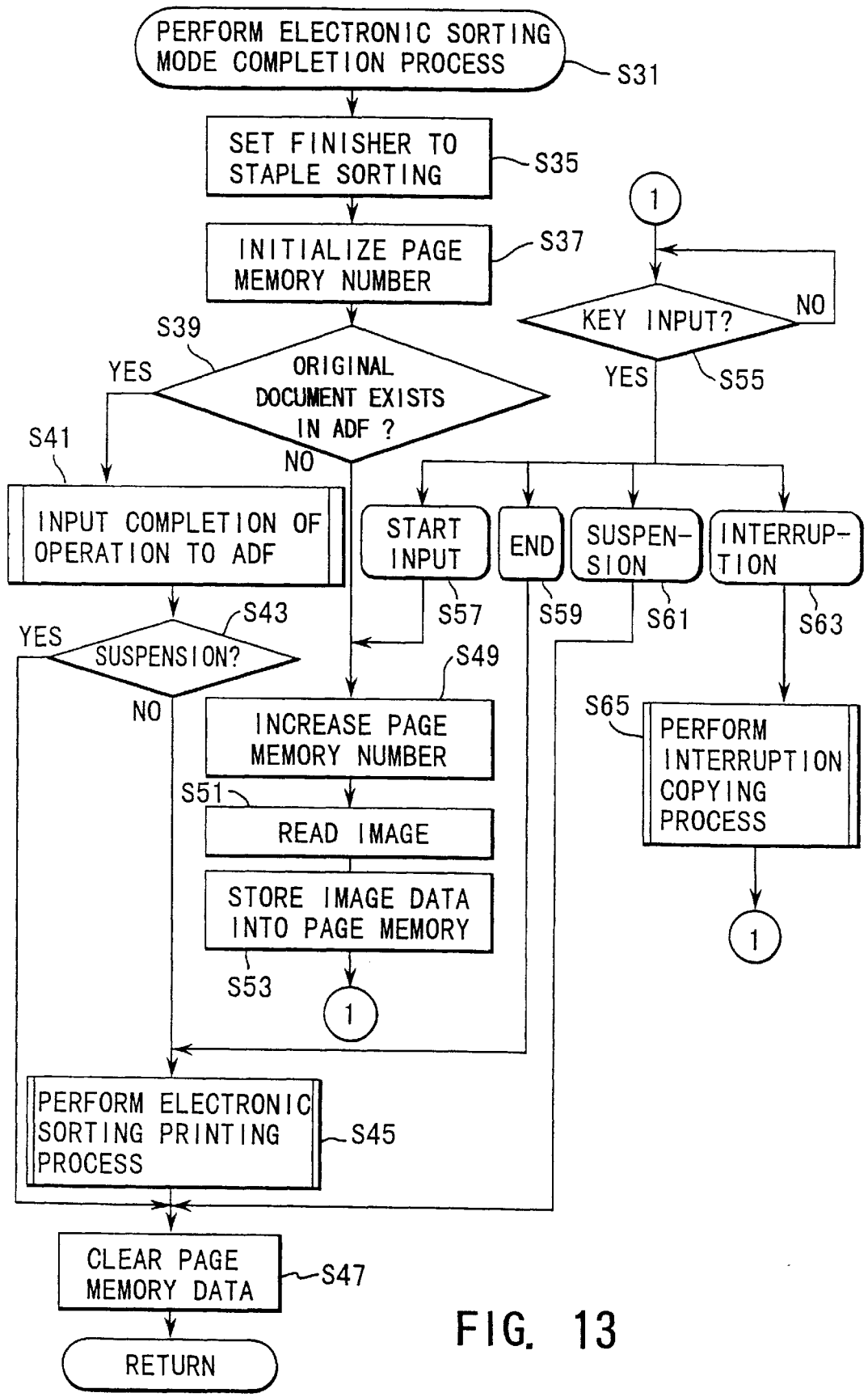
FIG. 13 is a flow chart illustrating a process for completing the electronic sorting mode.

A similar process to that shown in FIG. 13 is performed, except that until the original document D is exhausted (S66), feeding of the original document (S67 and S69) and the operation for reading the original document (S71 and S73) is performed. However, waiting for key input during the execution is not performed. If any valid key is depressed, that is, if an instruction of the operation (S77) (depression of the copy key 82), an interruption (S79) (depression of the interruption key 92) or suspension (S81) (depression of the suspension key displayed on the LCD portion 84) is instructed during execution, the instructed process (S83, S85, S87 or S89) is performed.

Figure 15:
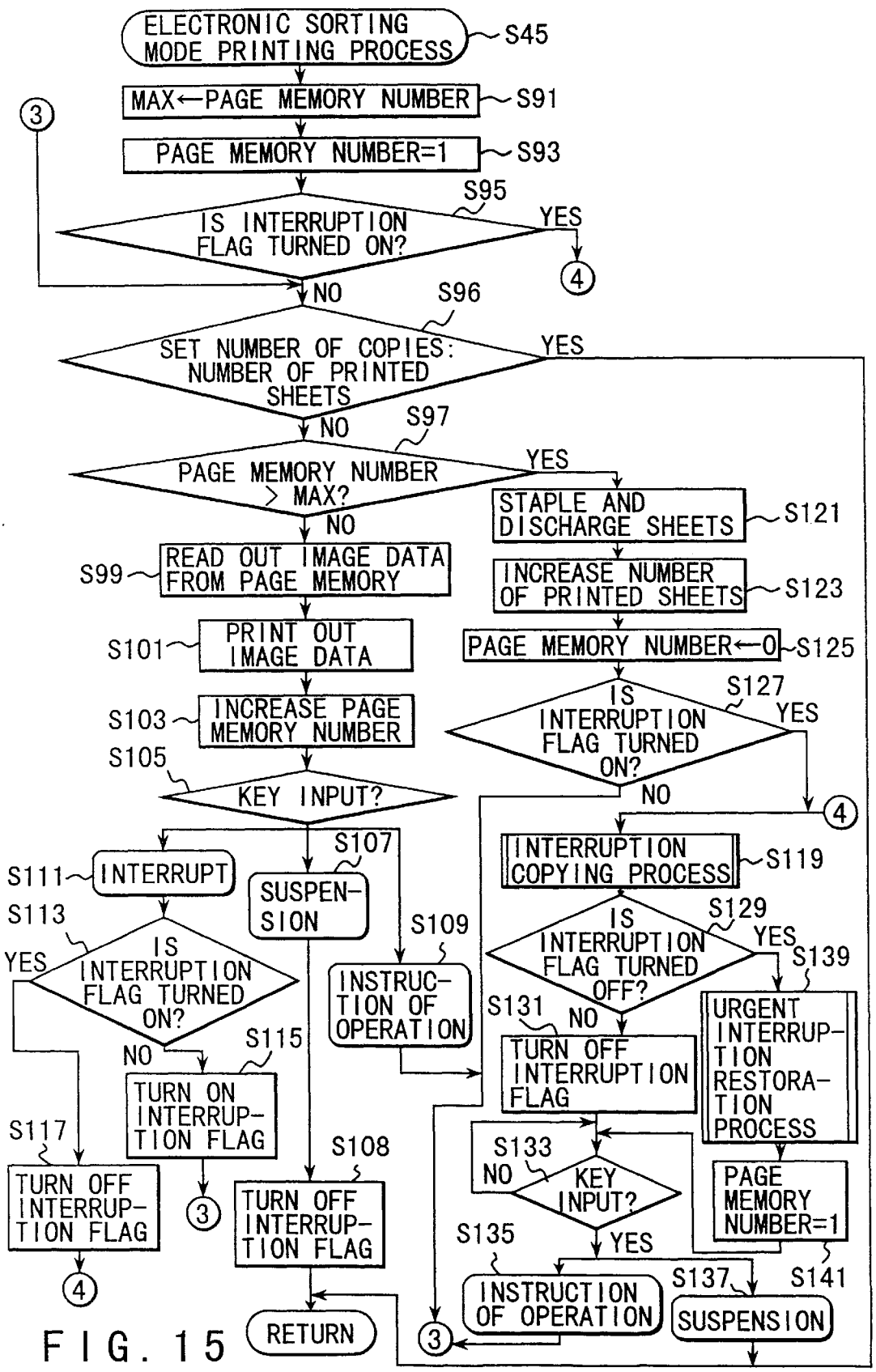
FIG. 15 is a flow chart illustrating an electronic sorting mode printing process.

The electronic sorting mode printing process (S45) for realizing an urgent interruption, which characterizes the present invention, will now be described with reference to a flow chart of FIG. 15.

Page data stored in an instructed address of the page memory number is expanded to be developed in the page buffer region M1 (S91). Then, developed image data is printed (S99 and S101) and then key input is checked (S105).

If valid suspension (S107) or instruction of operation (S109) is instructed during printing, the instructed process is performed. If invalid operation is instructed or set, it is assumed that no key has been depressed.

When a first instruction for interruption is issued during printing (S111), an interruption flag is turned on (S113 and S115), as in a conventional delay interrupt process. In the present invention, if a second instruction for interruption is issued by the interrupt key 92 (S117) while the interruption flag is turned on (S113) (i.e. waiting for delay interruption), it is determined that an urgent interruption is instructed. Thus, the interrupt copying process is immediately performed (S119).

The page memory number is being increased while printing is being performed (S103). After the final page has been printed (S97), the staple discharge or finisher discharge tray 154 is shifted (S121). Then, the number of copies to be printed is increased (S123) and the page memory number is restored to "0" (S125).

These operations are performed until the number of copies set on the parameter table 104a is completed (S96) or until suspension is instructed (S107).

After the staple discharge, it is determined whether an interruption had been instructed on the basis of the turning-on/off of the flag (S127). If the flag is on, an interruption copying process is performed (S119) and then the interruption flag, which has been turned on (S129), is turned off (S131). Then, the key input is checked (S133, S135 and S137).

When the interruption copying process is performed (S119), if the interruption flag is off (S129), the urgent interruption copying process is performed. Thus, an urgent interruption restoration process (i.e. removing sheets on the finisher discharge tray 154) is performed (S139) and the printing page is initialized and a restoration process is performed from the interrupt copying process (S141). In other words, when the control has returned from the urgent interruption copying process, the printing is resumed from the first page.

Figure 16:
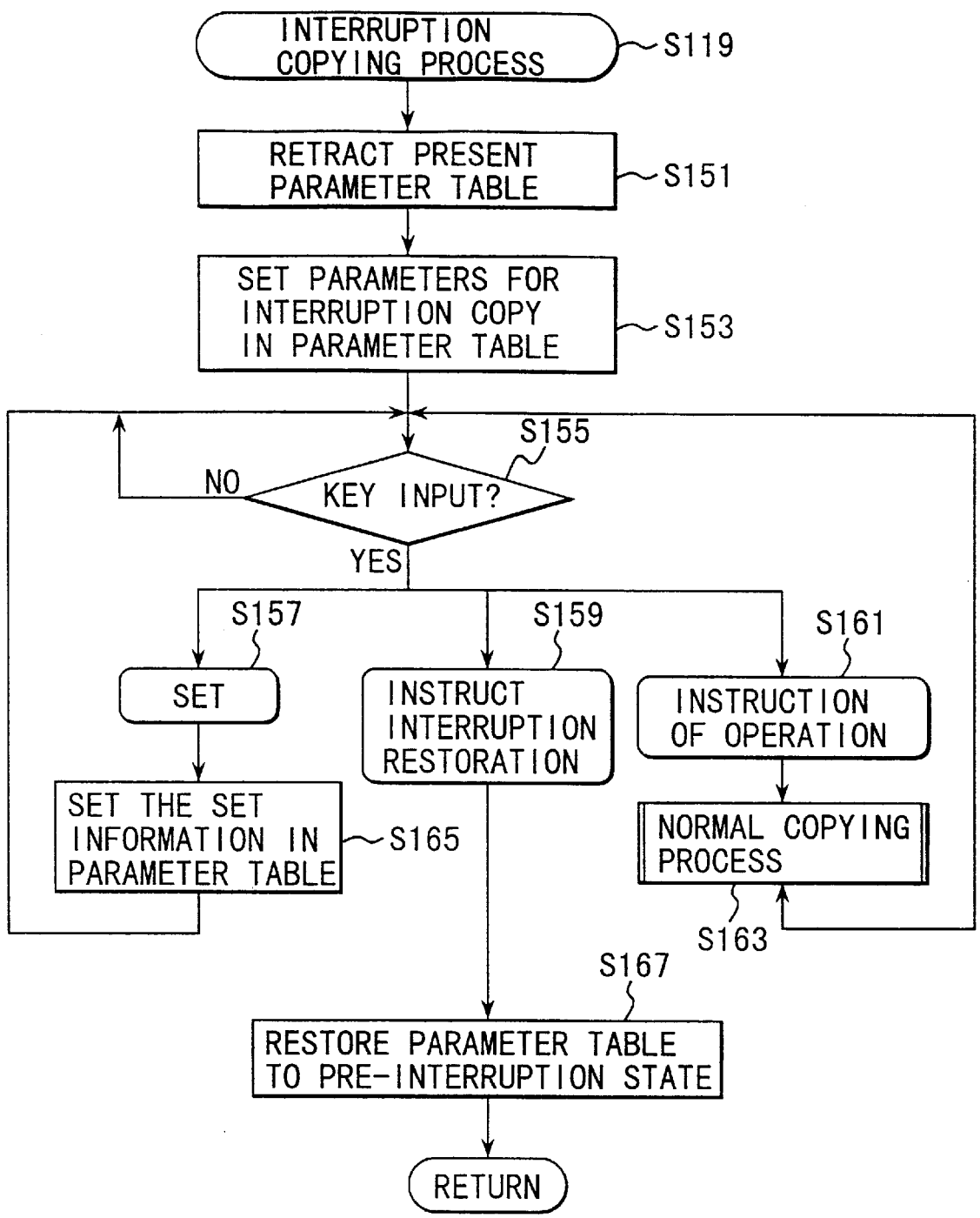
FIG. 16 is a flow chart illustrating an interrupt copying process.

The interruption copying process (S119) will now be described with reference to a flow chart of FIG. 16.

Since the interruption copying process (S119) is performed during the previous copying operation, the present parameters (supply source, size, etc.) in the parameter table 104a are retracted to the memory (S151) and default parameters for the interruption copying operation are set in the parameter table 104a (S153). When the operation is returned from the interruption copying operation, the previous parameters are restored to the parameter table 104a.

After key input (S155) has been performed to set parameters (S157 and S165), the process follows the instruction of the operation effected by the key input (S161) so that the normal copying process is performed (S163).

If the interrupt key 92 is depressed during the interrupt copying process (S159) to instruct return to interruption, the parameters used before the interruption, which have been retracted, are restored to the parameter table 104a and the previous copying operation is performed (S167).

The electronic sorting mode sequential process (S29) will now be described with reference to a flow chart of FIG. 17.

Specifically, the process from a time when images are read to a time when the read images are stored in the memories corresponding to the page memory numbers (S171, S173, S175, S177, S179 and S181) is the same as that in the flow chart of FIG. 13.

Page data stored at the instructed address of the page memory number is expanded so as to be developed on the page buffer region M1 (S183). The developed image data is printed (S185) and then key input is awaited (S187).

If there is the original document on the ADF 7 in step S175, a sequential operation ADF input process (S176) is performed.

In a case where an end (input of the end key displayed on the LCD portion 84) is instructed (S190) during waiting for key input (S187), reading of the original document and printing of the first copy are completed. Therefore, in the case of the staple mode, copying paper sheets P which are being discharged are stapled and discharged to the finisher discharge tray 154 (S193). In the case of the sorting mode, the finisher discharge tray 154 is shifted, and the counter for counting the number of copies to be printed (e.g. set in the RAM 104) is increased (S195). Then, the printing process is performed (S197) and the page memory 323 is cleared (S199).

If an interruption is instructed by the interruption key 92 (S192) while the key input is being awaited (S187), a step of checking the interruption flag (S201) is added in the present invention. If the interruption flag is turned off (S201), the interruption flag is turned on (S203) and the key input is awaited (S187). Specifically, if the interruption key 92 is depressed for the first time (i.e. the interruption flag in the off-state is turned on), the delay interruption process, which is branched to the interruption copying process at the beginning of the printing process, is performed (S201 and S203).

If it is determined (S201) that the interruption flag is turned on (S201), the interruption flag is turned off (S205) and the interruption copying process is performed (S207). Specifically, if the interruption key 92 is depressed twice, the urgent interruption copying process is carried out.

After the operation is restored from the urgent interruption copying process, the urgent interruption restoration process (i.e. removing sheets on the discharge tray) is performed (S209) and the key input is awaited (S211). Since the already discharged sheets are removed, a manual-setting completion type process with no paper discharge is performed subsequently.

Figure 18:
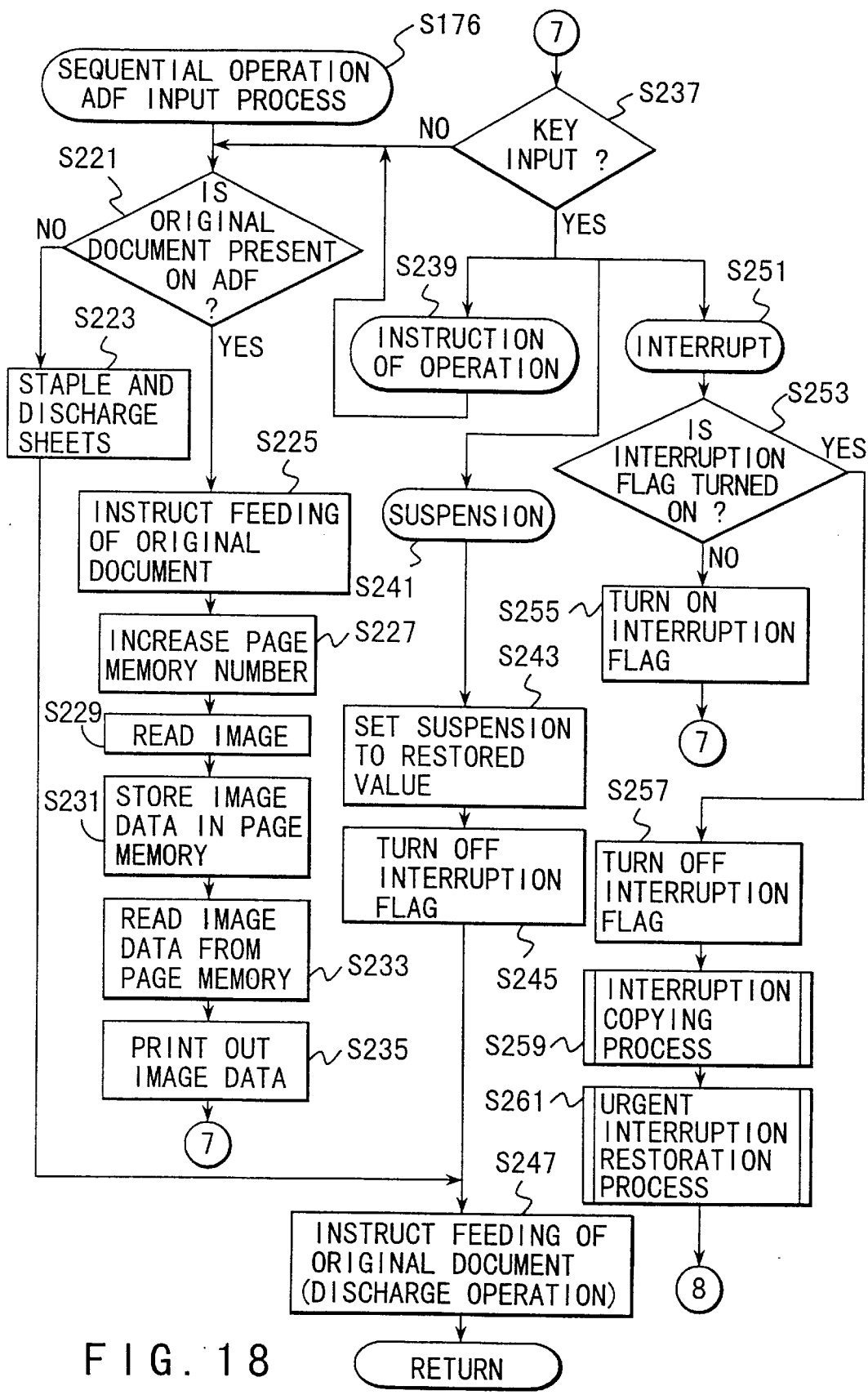
FIG. 18 is a flow chart illustrating a process of inputting sequential operation to the ADF.

The sequential operation ADF input process (S176) will now be described with reference to a flow chart shown in FIG. 18.

Figure 17:
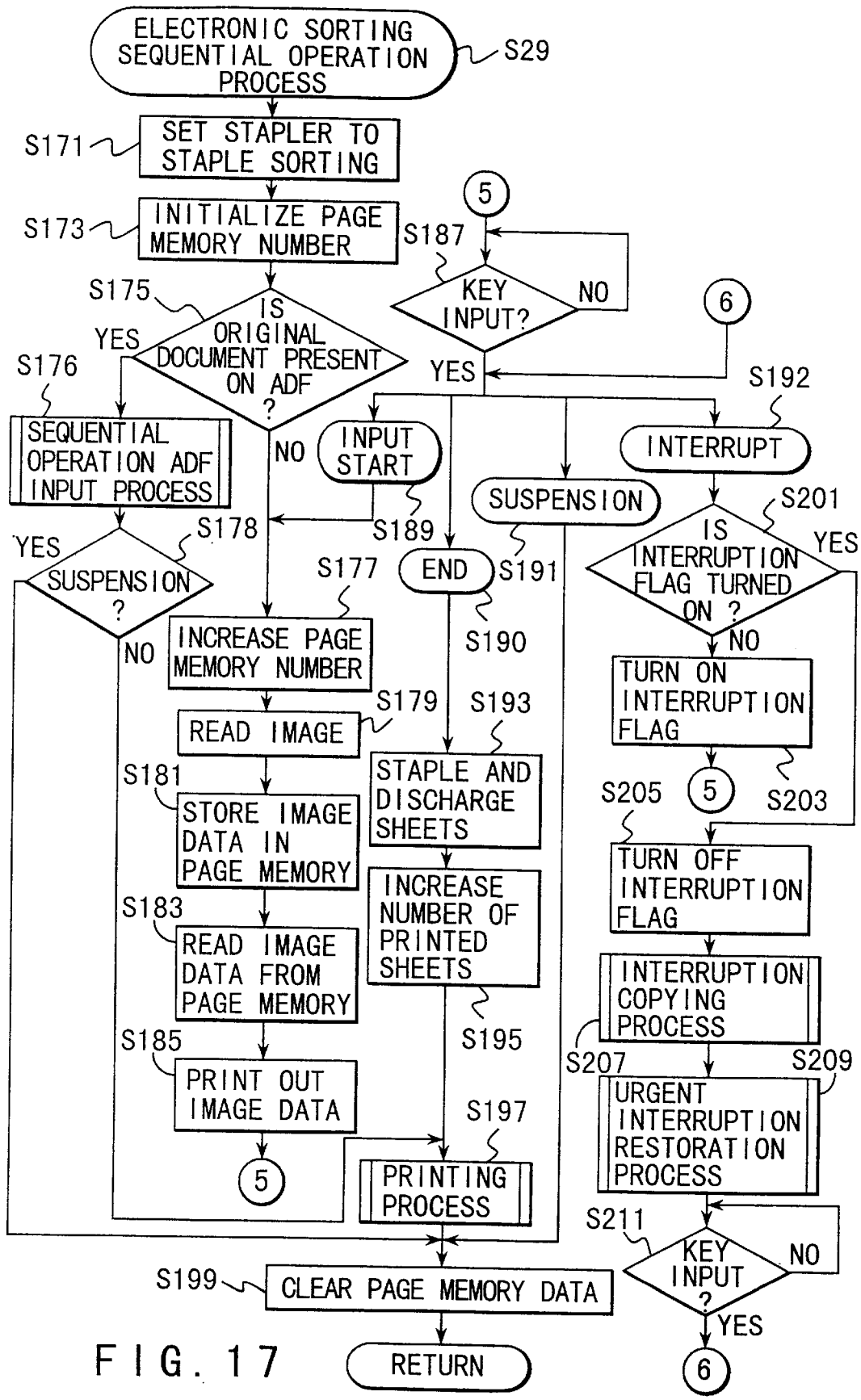
FIG. 17 is a flow chart illustrating an electronic sorting mode sequential operation process.

A similar process to that shown in FIG. 17 is performed except that until the original document D on the ADF 7 is exhausted, feeding of the original document and the operation for reading the original document are performed. However, waiting for key input during the execution is not performed. If any valid key is depressed, that is, if an instruction to perform the operation is issued (depression of the copy key 82) during execution, the instructed process is performed (S221, S223, S225, S227, S229, S231, S233, S235 and S247).

If suspension (S241) (depression of the suspension key displayed on the LCD portion 84) is instructed while the key input is being awaited (S237) after execution, the suspension ("clear") is set for the restored value stored in main CPU 100 (S243) and the interruption flag is turned off (S245). Thus, the feeding of the original document is instructed (S247).

If an interruption is instructed by the interruption key 92 (S251) while the key input is being awaited (S237), a step of checking the interruption flag (S253) is added in the present invention. If the interruption flag is turned off (S253), the interruption flag is turned on (S255) and the key input is awaited (S237). Specifically, if the interruption key 92 is depressed for the first time (i.e. the interruption flag in the off-state is turned on), the delay interruption process, which is branched to the interruption copying process at the beginning of the printing process, is performed (S253 and S255).

If it is determined (S253) that the interruption flag is turned on (S253), the interruption flag is turned off (S257) and the interruption copying process is performed (S259). Specifically, if the interruption key 92 is depressed twice, the urgent interruption copying process is carried out.

After the operation is restored from the urgent interruption copying process, the urgent interruption restoration process (i.e. removing sheets on the discharge tray) is performed (S261). Since the already discharged sheets are removed, a completion type ADF input process with no paper discharge, as illustrated in FIG. 14, is performed subsequently.

Figure 19:
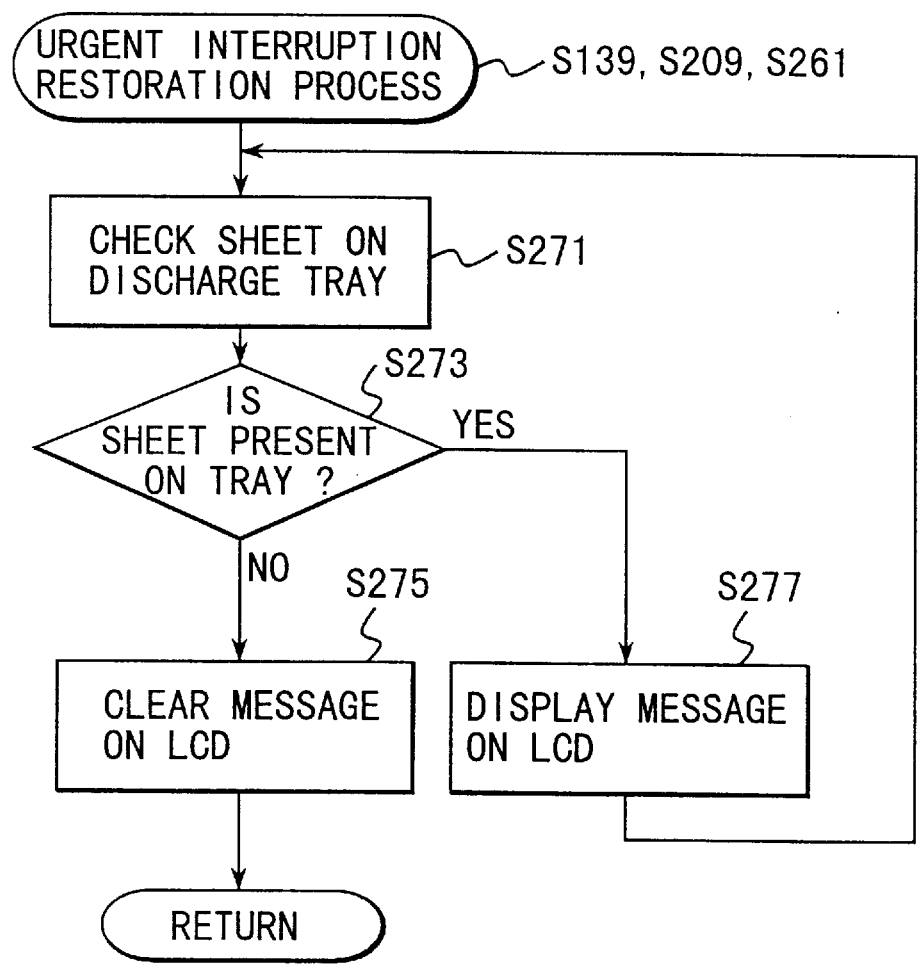
FIG. 19 is a flow chart illustrating an urgent interrupt restoration process.

The urgent interruption restoration process in steps S139, S209 and S261 will now be described with reference to a flow chart of FIG. 19.

Specifically, the main CPU 100 checks the discharge tray sensor 154a provided on the finisher discharge tray 154 of finisher 150 (S271) and displays an alarm message on the LCD portion 84 until the sheets on the finisher discharge tray 154 is removed (S273, S275 and S277).

Figure 20:
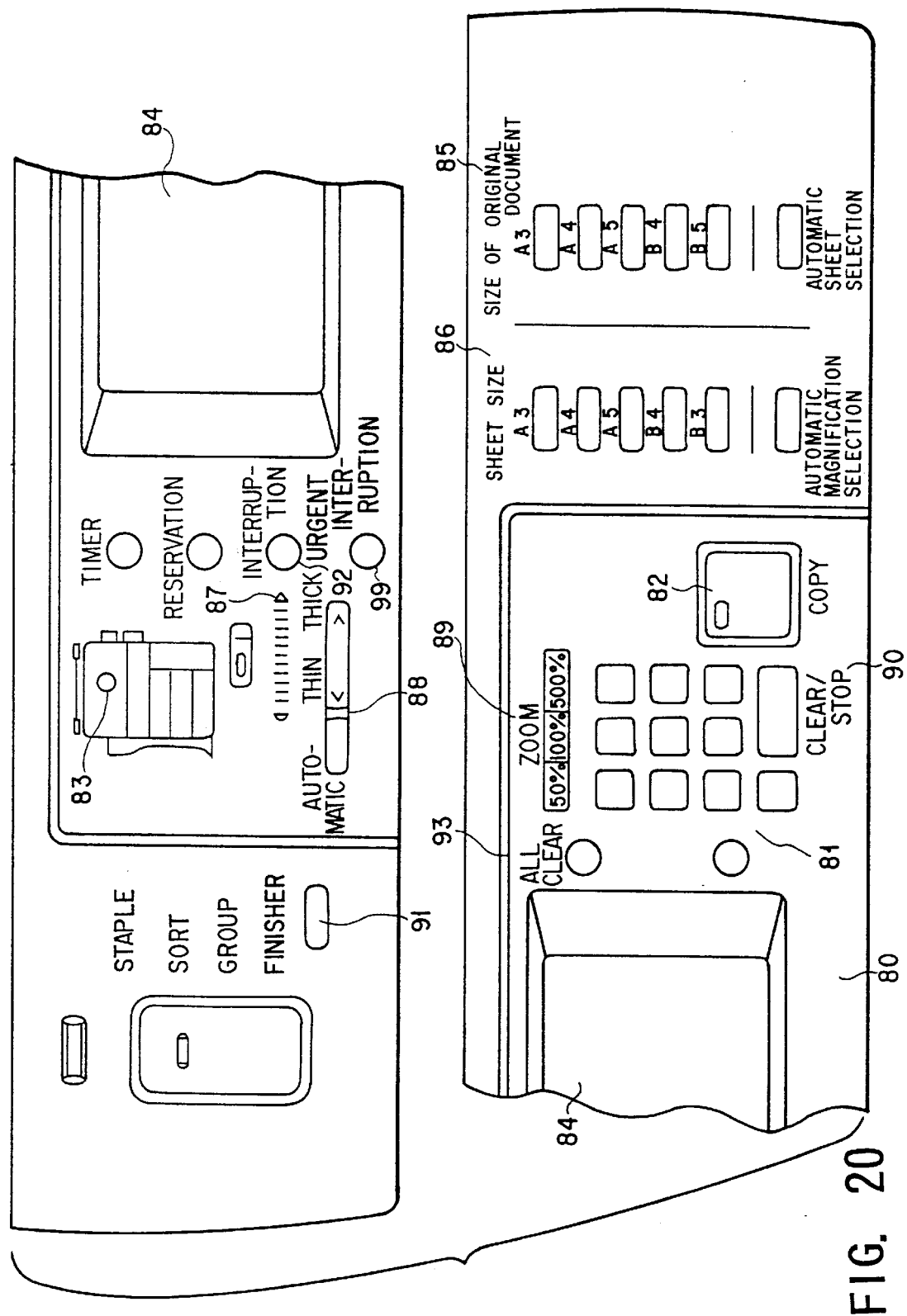
FIG. 20 is a plan view showing the structure of an operation panel.

FIG. 20 shows an operation panel 98 according to another embodiment of the invention.

The operation panel 98 differs from the above-described operation panel 80 in that an urgent interruption key 99 indicating an urgent interruption is provided. The other structure is common to that of the panel 80, and a description thereof is omitted.

The urgent interruption operation using the operation panel 98 will now be described with reference to a flow chart of FIG. 21.

Specifically, when the urgent interruption key 99 is depressed to instruct the urgent interruption (S301), an urgent interruption copying process is executed (S303). After the operation is restored from the urgent interruption copying process, a urgent interruption restoration process (i.e. removing sheets on the discharge tray) is performed (S305) and thus the urgent interruption process is completed.

As has been described above, according to the present invention, if the interruption key is depressed once again during the delay interruption process in the electronic sorting mode, the urgent interruption process is performed. Thus, even if the delay interrupt process is being carried out, the interruption copying operation can be performed without waiting for the completion of copying of one copy.

After the operation has restored from the urgent interruption process, an instruction is displayed to remove all sheets from the discharge tray. In addition, the sequential operation is changed to the completion operation, and the discharge of sheets is resume from the first page during printing. Even if the urgent interruption process is being executed, the division of a copy to be stapled is correctly determined.

Since the interruption key for instructing a delay interruption and the interruption key for instructing an urgent interruption are both provided, the delay interruption as well as the urgent interruption can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An image forming apparatus, comprising;
    means for reading images of a plurality of original documents to generate image data;
    means for storing image data generated by the reading means;
    means for forming images on an image forming medium on the basis of the image data so as to obtain a first set of image forming mediums and a second set of image forming mediums sequentially;
    first instruction means for instructing an interruption process;
    first process means for delaying the interruption process, when the interruption process has been instructed by the first instruction means while the image forming means is obtaining the first set of image forming mediums, until the image forming operation for the first set of the image forming mediums is completed, and for enabling the other image forming operation by the image forming means after the image forming operation for the first set of the image forming mediums and before the image forming operation for the second set of the image forming mediums;
    second instructing means for instructing an urgent interruption process; and
    second process means for interrupting the image forming operation even while the image forming means is obtaining the first set of image forming mediums when the urgent interruption process is instructed, and for enabling the other image forming operation by the image forming means.

2. The image forming apparatus according to claim 1, wherein said first instruction means instructs the interruption process of the first process means when a key instructing the interrupt process has been once depressed, and said second instruction means instructs the interruption process of the second process means when the key instructing the interruption process has been depressed once again.

3. The image forming apparatus according to claim 1, wherein said first instruction means instructs the interruption process of the first process means when a key instructing the interrupt process has been depressed, and said second instruction means instructs the interruption process of the second process means when a key instructing an urgent interruption process has been depressed.

4. An image forming apparatus, comprising;
    means for reading images of a plurality of original documents to generate image data;
    means for storing image data generated by the reading means;
    means for forming images on an image forming medium on the basis of the image data so as to obtain a first set of image forming mediums and a second set of image forming mediums sequentially;
    first instruction means for instructing an interruption process;
    first process means for delaying the interruption process, when the interruption process has been instructed by the first instruction means while the image forming means is obtaining the first set of image forming mediums, until the image forming operation for the first set of the image forming medium is completed, and for enabling the other image forming operation by the image forming means after the image forming operation for the first set of the image forming medium and before the image forming operation for the second set of the image forming medium;
    second instructing means for instructing an urgent interruption process while the interruption process is being delayed by the first process means; and
    second process means for interrupting the image forming operation even while the image forming means is obtaining the first set of image forming mediums when the urgent interruption process is instructed, and for enabling the other image forming operation by the image forming means.

5. The image forming apparatus according to claim 4, wherein said second instruction means instructs the interruption process of the second process means if, after the instruction process of the first process means is instructed when a key for instructing the interrupt process has been once depressed through the first instruction means, the key for instructing the interruption process is depressed once again while the interruption process of the first process means is being delayed.

6. The image forming apparatus according to claim 4, wherein said second processing means, upon an instruction from the second instruction means, immediately performs the interruption process even when the image forming operation for obtaining said first set of image forming mediums is being performed, and thereafter the image forming operation process is resumed from the first page of the first set of image forming mediums.

7. The image forming apparatus according to claim 4, further comprising:
   third instruction means for instructing continuation of the image forming operation for obtaining said first set of image forming mediums, after the second processing means has completed the interruption process, which was performed immediately upon an instruction from the second instruction means even when the image forming operation for the first set of image forming mediums was being performed; and
   control means for resuming the image forming operation process, which is instructed by the third instruction means, from the first page of the first set of image forming mediums.

8. The image forming apparatus according to claim 4, further comprising:
   display means for displaying an alarm when there is the discharged image forming medium on which the image was formed in the image formation operation process, after the second processing means has completed the interruption process, which was performed immediately upon an instruction from the second instruction means even when the image forming operation for said first set of image forming mediums was being performed;
   third instruction means for instructing continuation of the image forming operation for the first set of image forming mediums, after the display of the alarm on the display means is stopped; and
   control means for resuming the image forming operation process, which is instructed by the third instruction means, from the first page of the first set of image forming mediums.

9. An image forming apparatus, comprising;
   means for reading images of a plurality of original documents to generate image data;
   means for storing image data generated by the reading means;
   means for forming images on an image forming medium on the basis of the image data so as to obtain a first set of image forming mediums and a second set of image forming mediums sequentially;
   stapling process means for performing a stapling process for the image forming mediums on which the images have been formed by the image forming means;
   first instruction means for instructing an interruption process;
   first process means for delaying the interruption process, when the interruption process has been instructed by the first instruction means while the image forming means is obtaining the first set of image forming mediums, until the stapling process for the first set of the image forming mediums is completed, and for enabling the other image forming operation by the image forming means after the stapling process for the first set of the image forming mediums and before the image forming operation for the second set of the image forming mediums;
   second instructing means for instructing an urgent interruption process; and
   second process means for interrupting the image forming operation even while the image forming means is obtaining the first set of image forming mediums when the urgent interruption process is instructed, and for enabling the other image forming operation by the image forming means.

10. The image forming apparatus according to claim 9, wherein said second processing means, upon an instruction from the second instruction means, immediately performs the interruption process even when the image forming operation for the first set of image forming mediums is being performed, and thereafter the second processing means performs the image forming operation for the image forming mediums successively from the first page with use of the image data stored in the storage means and then resumes the stapling process and the image formation process for the first set of image forming mediums.

11. The image forming apparatus according to claim 9, wherein said second process means immediately performs the interruption process instructed by the second instruction means while the interruption process is delayed by the first process means, even when the image formation operation for the first set of the image forming mediums is being performed.

12. The image forming apparatus according to claim 9, wherein said second process means immediately instructs the interruption process, upon an instruction by the second instruction means, while the interruption process is delayed by the first process means, even when the image formation operation for the first set of the image forming mediums is being performed.

13. An image forming apparatus, comprising;
   means for reading images of a plurality of original documents to generate image data;
   means for storing image data generated by the reading means;
   means for forming images on an image forming medium on the basis of the image data so as to obtain a first set of image forming mediums and a second set of image forming mediums sequentially;
   first process means for delaying the interruption process during an image formation operation for the first set of the image forming mediums, until the image formation operation for the first set of the image forming mediums is completed, and for enabling the other image forming operation by the image forming means after the image forming operation for the first set of the image forming mediums and before the image forming operation for the second set of the image forming mediums; and
   second process means for immediately performing an interruption process, while the interruption process is being delayed by the first process means.

14. An image forming apparatus, comprising;
   means for reading images of a plurality of original documents to generate image data;
   means for storing image data generated by the reading means;

means for forming images on an image forming medium on the basis of the image data so as to obtain a first set of image forming mediums and a second set of image forming mediums sequentially;

first interruption instruction means for delaying the interruption process during an image formation operation for the first set of the image forming mediums, until the image formation operation for the first set of the image forming mediums is completed, and for instructing the other image forming operation by the image forming means after the image forming operation for the first set of the image forming mediums and before the image forming operation for the second set of the image forming mediums; and second interruption instruction means for immediately instructing an interruption process, while the interruption process is being delayed by the first interruption instruction means.

15. An image forming apparatus, comprising;

means for reading images of a plurality of original documents;

means for forming images on an image forming medium on the basis of the image read by the reading means so as to obtain a first set of image forming mediums and a second set of image forming mediums sequentially;

first instruction means for instructing an interruption process;

means for delaying the interruption process, when the interruption process has been instructed by the first instruction means while the image forming means is obtaining the first set of image forming mediums, until the image forming operation for the first set of the image forming mediums is completed, and for enabling the other image forming operation by the image forming means after the image forming operation for the first set of the image forming mediums and before the image forming operation for the second set of the image forming mediums;

second instructing means for instructing an urgent interruption process; and means for interrupting the image forming operation even while the image forming means is obtaining the first set of image forming mediums when the urgent interruption process is instructed, and for enabling the other image forming operation by the image forming means.

16. An image forming apparatus, comprising; means for storing image data; means for forming images on an image forming medium on the basis of the image data so as to obtain a first set of image forming mediums and a second set of image forming mediums sequentially; first instruction means for instructing an interruption process;

means for delaying the interruption process, when the interruption process has been instructed by the first instruction means while the image forming means is obtaining the first set of image forming mediums, until the image forming operation for the first set of the image forming mediums is completed, and for enabling the other image forming operation by the image forming means after the image forming operation for the first set of the image forming mediums and before the image forming operation for the second set of the image forming mediums;

second instructing means for instructing an urgent interruption process; and means for interrupting the image forming operation even while the image forming means is obtaining the first set of image forming mediums when the urgent interruption process is instructed, and for enabling the other image forming operation by the image forming means.

* * * * *